United States Patent
Liu et al.

(10) Patent No.: US 12,501,496 B2
(45) Date of Patent: *Dec. 16, 2025

(54) METHOD AND DEVICE IN NODE USED FOR WIRELESS COMMUNICATION WITH LARGE TRANSMISSION DELAY

(71) Applicant: APOGEE NETWORKS, LLC, Dallas, TX (US)

(72) Inventors: Zheng Liu, Shanghai (CN); Xiaobo Zhang, Shanghai (CN)

(73) Assignee: APOGEE NETWORKS, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,245

(22) Filed: Mar. 13, 2024

(65) Prior Publication Data

US 2024/0267958 A1 Aug. 8, 2024

Related U.S. Application Data

(63) Continuation of application No. 17/848,366, filed on Jun. 23, 2022, now Pat. No. 12,035,378, which is a
(Continued)

(30) Foreign Application Priority Data

Dec. 26, 2019 (CN) .......................... 201911365303.2

(51) Int. Cl.
*H04W 74/0808* (2024.01)
*H04L 27/26* (2006.01)
(Continued)

(52) U.S. Cl.
CPC ....... *H04W 74/085* (2013.01); *H04L 27/2605* (2013.01); *H04W 56/004* (2013.01)

(58) Field of Classification Search
None
See application file for complete search history.

(56) References Cited

U.S. PATENT DOCUMENTS

| 12,035,378 B2* | 7/2024 | Liu ....................... H04L 27/261 |
| 2016/0049192 A1 | 2/2016 | Lee |

(Continued)

FOREIGN PATENT DOCUMENTS

| CN | 109462462 A | 3/2019 |
| CN | 110545138 A | 12/2019 |

(Continued)

OTHER PUBLICATIONS

First Office Action of Chinses patent application No. CN201911365303.2 dated Apr. 18, 2022.
(Continued)

*Primary Examiner* — Diane L Lo
(74) *Attorney, Agent, or Firm* — Volpe Koenig

(57) ABSTRACT

The present application provides a method and a device in a node used for wireless communications. A node receives first information and second information, the second information being used to determine a first timing offset value; determines a first timing compensation value, and transmits a first signal; herein, a time interval length between a start time for transmission of the first signal and a reference time is equal to a target timing compensation value, where the start time for the first signal transmission is earlier than the reference time, the reference time being a boundary time for a reference time-domain resource unit, the first information is used to determine a time-domain position of the reference time-domain resource unit; the first timing compensation value and the first timing offset value are jointly used to determine the target timing compensation value. The present application can improve the random access performance.

20 Claims, 5 Drawing Sheets

Related U.S. Application Data continuation of application No. PCT/CN2020/129973, filed on Nov. 19, 2020.

(51) Int. Cl.
*H04W 56/00* (2009.01)
*H04W 74/0833* (2024.01)

(56) References Cited

U.S. PATENT DOCUMENTS

2018/0359790 A1* 12/2018 Ingale .................... H04W 72/51
2020/0314913 A1   10/2020 Rastegardoost et al.
2021/0127369 A1*  4/2021 Ma ........................ H04L 5/0048

FOREIGN PATENT DOCUMENTS

CN   110557239 A   12/2019
CN   110557782 A   12/2019

OTHER PUBLICATIONS

First Search Report of Chinses patent application No. CN201911365303.2 dated Apr. 11, 2022.
Notification to Grant Patent Right for Invention of Chinses patent application No. CN201911365303.2 dated Sep. 5, 2022.
ISR received in application No. PCT/CN2020/129973 dated Feb. 18, 2021.
ZTE TP for section 6.3 on UL timing and PRACH 3GPP TSG RAN WG1 #99 R1-1912614 Nov. 8, 2019.
Ericsson on NTN synchronization, random access, and timing advance 3GPP TSG-RAN WG1 Meeting #98bis R1-1910982 Oct. 4, 2019.
Third Generation Partnership Project, "Technical Specification Group Radio Access Network; NR; Physical channels and modulation (Release 15)," 3GPP TS 38.211 V15.7.0 (Sep. 2019).
Third Generation Partnership Project, "Technical Specification Group Radio Access Network; NR; Multiplexing and channel coding (Release 15)," 3GPP TS 38.212 V15.7.0 (Sep. 2019).

* cited by examiner

| Timing compensation value | Timing offset value | Candidate format |
|---|---|---|
| 0 | N/A | Format #1 |
| >0 | (0, a] | Format #2 |
| >0 | (a, b] | Format #3 |
| >0 | (b, c] | Format #4 |

FIG. 8

| Candidate format | Timing offset value |
|---|---|
| Format #A | $T_{offset\#1}$ |
| Format #B | $T_{offset\#2}$ |
| Format #C | $\mathbf{T_{offset\#3}}$ |
| Format #D | $T_{offset\#4}$ |

FIG. 9

| Timing compensation error | Timing offset value |
|---|---|
| $(0, T_{e1}]$ | $T_{offset\#1}$ |
| $\mathbf{(T_{e1}, T_{e2}]}$ | $\mathbf{T_{offset\#2}}$ |
| $(T_{e2}, T_{e3}]$ | $T_{offset\#3}$ |
| $(T_{e3}, T_{e4}]$ | $T_{offset\#4}$ |

FIG. 10

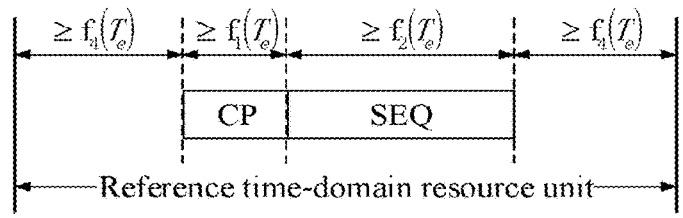
FIG. 11
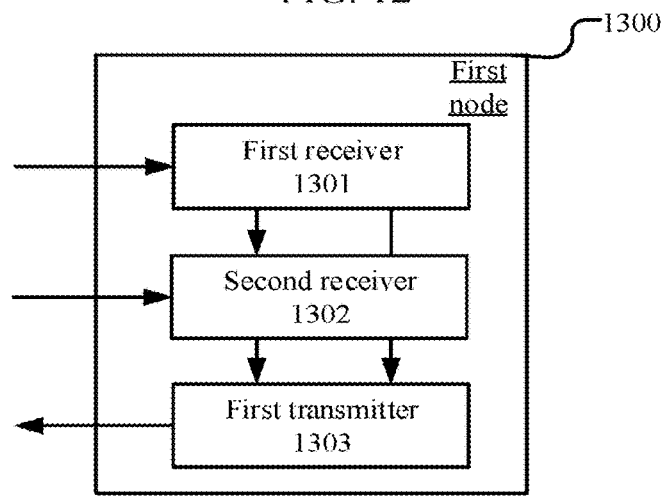
FIG. 12
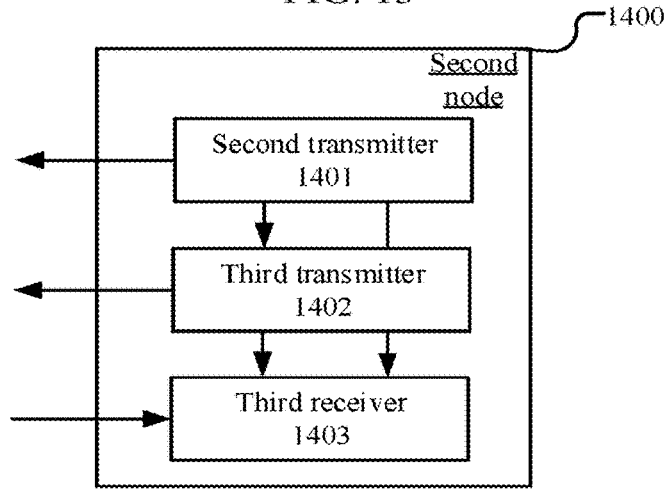
FIG. 13
FIG. 14

METHOD AND DEVICE IN NODE USED FOR WIRELESS COMMUNICATION WITH LARGE TRANSMISSION DELAY

CROSS REFERENCE TO RELATED APPLICATIONS

This application is the continuation of the U.S. patent application Ser. No. 17/848,366, filed on Jun. 23, 2022, which is the continuation of International patent application PCT/CN2020/129973, filed on Nov. 19, 2020, which claims the priority benefit of Chinese Patent Application No. 201911365303.2, filed on Dec. 26, 2019, the full disclosure of which is incorporated herein by reference.

BACKGROUND

Technical Field

The present application relates to transmission methods and devices in wireless communication systems, and in particular to a transmission scheme and a device for random access in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

For better adaptability to diverse application scenarios and fulfillment of various requests, the 3GPP RAN #75 Plenary approved a study item of Non-Terrestrial Networks (NTN) under NR, which was started with R15 of Technical Specifications. And later at the 3GPP RAN #79 Plenary, a decision was made on studies of schemes in NTN and a follow-up WI was decided at the 3GPP RAN #86 Plenary to be initiated to standardize relevant techniques.

SUMMARY

In NTN and similar networks with a great transmission delay and a large transmission delay difference, requirements for a large transmission delay difference and uplink and downlink transmissions with sync may lead to a result that the current (e.g., NR 5G Release 16) design based on traditional Terrestrial Networks cannot be directly reused, particularly, the traditional random access design may not be applicable in NTN, therefore, new designs are required to support networks with large transmission delay and large transmission delay difference to guarantee normal communications.

In view of the issue that the existing design in the large-delay network cannot work or work effectively because of a large delay and large delay difference, the present application provides a solution. It should be noted that the description above only took NTN scenarios as a typical example or application scenario, but the present application also applies to other scenarios confronting similar problems, such as other large-delay networks, where similar technical effects can be achieved. Additionally, the adoption of a unified solution for various scenarios, including but not limited to NTN scenarios, contributes to the reduction of hardcore complexity and costs. If no conflict is incurred, embodiments in the first node in the present application and the characteristics of the embodiments are also applicable to a second node, and vice versa. Particularly, for interpretations of the terminology, nouns, functions and variables (unless otherwise specified) in the present application, refer to definitions given in TS36 series, TS38 series and TS37 series of 3GPP specifications.

The present application provides a method in a first node for wireless communications, comprising:
  receiving first information; and
  receiving second information, the second information being used to determine a first timing offset value; and
  determining a first timing compensation value, and transmitting a first signal;
  herein, a time interval length between a start time for transmitting the first signal and a reference time is equal to a target timing compensation value, where the start time for transmitting the first signal is earlier than the reference time, and the reference time is a boundary time for a reference time-domain resource unit, the first information being used to determine a position of the reference time-domain resource unit in time domain; the first timing compensation value and the first timing offset value are jointly used to determine the target timing compensation value, the first timing offset value being greater than 0; the first signal is used for a random access, the first signal carrying a preamble sequence.

In one embodiment, the first timing offset value is introduced based on the first timing compensation value to determine the target timing compensation value, which further determines a start time for transmission of the first signal, thus enabling the UE to perform only partial pre-compensation when pre-compensating for a transmission timing for PRACH according to a TA compensation value autonomously obtained by the UE, which avoids collisions between PRACH transmission and other uplink transmissions resulting from an error of calculation (which is potentially caused due to the positioning precision) and a timing error as the UE determines the TA compensation value, thus increasing the success rate of random access or the resource utilization ratio.

In one embodiment, by determining the first timing offset value through the second information, the network can control the fallback of compensation according to coverage, satellite delay characteristics and other aspects when performing partial compensation for the transmission timing for PRACH, thereby avoiding excessive compensation or lack of compensation, further enhancing the random access performance.

According to one aspect of the present application, the above method is characterized in that at least one of the first information or the second information is used to determine X candidate formats, where X is a positive integer greater than 1; at least one of the first timing compensation value or the first timing offset value is used to determine a first format out of the X candidate formats, the first format is one of the X candidate formats, and the first format is used to determine the first signal.

In one embodiment, by determining the first format out of the X candidate formats with at least one of the first timing compensation value or the first timing offset value, the UE is enabled to select a PRACH format according to whether it is capable of performing pre-compensation for uplink transmission timing, thus achieving support for users with varying compensation capabilities within a large-delay network.

In one embodiment, by determining the first format out of the X candidate formats with the first timing offset value, it is ensured that a PRACH format can be determined or limited according to a fallback value (or offset value) for partial compensation, thus making the compatibility between timing pre-compensation and the PRACH format possible, which, in turn avoids collisions between the PRACH transmission and other uplink transmissions, thus enhancing the performance of random access.

According to one aspect of the present application, the above method is characterized in that when only the first timing compensation value of the first timing compensation value and the first timing offset value is used to determine the first format, the first format is used to determine the first timing offset value.

In one embodiment, by determining the first timing offset value with the first format, a fallback value (or offset value) for partial compensation can thus be determined according to a configured PRACH format, with full consideration paid to an offset value of timing pre-compensation that is allowable for the PRACH format, one can guarantee a headroom for avoidance of collisions between a PRACH transmission and uplink transmission before and after, thus further preventing collisions of the PRACH with other uplink transmissions.

According to one aspect of the present application, the above method is characterized in that a capability of the first node is used to determine the first timing compensation value, the first timing offset value being related to an error of the first timing compensation value determined by the first node.

According to one aspect of the present application, the above method is characterized in that the second information is used to determine a first parameter set, the first parameter set being used to determine the first timing offset value, the first parameter set consisting of a positive integer number of parameter(s).

According to one aspect of the present application, the above method is characterized in that at least one of a length of a cyclic prefix comprised in the first signal in time domain or a number of time-domain resources occupied by a preamble sequence carried by the first signal is related to an error of the first timing compensation value determined by the first node.

In one embodiment, when performing the selection of a cyclic prefix and a time-domain length of a preamble sequence, on the condition that limitation of an error of pre-compensation is taken into account, a selected PRACH format can be used to optimize the random access performance.

The present application provides a method in a second node for wireless communications, comprising:
transmitting first information;
transmitting second information, the second information being used to determine a first timing offset value; and
detecting a first signal;
herein, a time interval length between a start time for transmitting the first signal and a reference time is equal to a target timing compensation value, where the start time for transmitting the first signal is earlier than the reference time, and the reference time is a boundary time for a reference time-domain resource unit, the first information being used to indicate a position of the reference time-domain resource unit in time domain; a first timing compensation value and the first timing offset value are jointly used to determine the target timing compensation value, the first timing offset value being greater than 0; the first signal is used for a random access, the first signal carrying a preamble sequence.

According to one aspect of the present application, the above method is characterized in that at least one of the first information or the second information is used to determine X candidate formats, where X is a positive integer greater than 1; at least one of the first timing compensation value or the first timing offset value is used to determine a first format out of the X candidate formats, the first format is one of the X candidate formats, and the first format is used to determine the first signal.

According to one aspect of the present application, the above method is characterized in that when only the first timing compensation value of the first timing compensation value and the first timing offset value is used to determine the first format, the first format is used to determine the first timing offset value.

According to one aspect of the present application, the above method is characterized in that a capability of the first node is used to determine the first timing compensation value, the first timing offset value being related to an error of the first timing compensation value determined by the first node.

According to one aspect of the present application, the above method is characterized in that the second information is used to determine a first parameter set, the first parameter set being used to determine the first timing offset value, the first parameter set consisting of a positive integer number of parameter(s).

According to one aspect of the present application, the above method is characterized in that at least one of a length of a cyclic prefix comprised in the first signal in time domain or a number of time-domain resources occupied by a preamble sequence carried by the first signal is related to an error of the first timing compensation value determined by the first node.

The present application provides a first node for wireless communications, comprising:
a first receiver, receiving first information; and
a second receiver, receiving second information, the second information being used to determine a first timing offset value; and
a first transmitter, determining a first timing compensation value, and transmitting a first signal;
herein, a time interval length between a start time for transmitting the first signal and a reference time is equal to a target timing compensation value, where the start time for transmitting the first signal is earlier than the reference time, and the reference time is a boundary time for a reference time-domain resource unit, the first information being used to determine a position of the reference time-domain resource unit in time domain; the first timing compensation value and the first timing offset value are jointly used to determine the target timing compensation value, the first timing offset value being greater than 0; the first signal is used for a random access, the first signal carrying a preamble sequence.

The present application provides a second node for wireless communications, comprising:
a second transmitter, transmitting first information; and a third transmitter, transmitting second information, the second information being used to determine a first timing offset value; and a third receiver, detecting a first signal;

herein, a time interval length between a start time for transmitting the first signal and a reference time is equal to a target timing compensation value, where the start time for transmitting the first signal is earlier than the reference time, and the reference time is a boundary time for a reference time-domain resource unit, the first information being used to indicate a position of the reference time-domain resource unit in time domain; a first timing compensation value and the first timing offset value are jointly used to determine the target timing compensation value, the first timing offset value being greater than 0; the first signal is used for a random access, the first signal carrying a preamble sequence.

In one embodiment, the method in the present application has the following advantages:

the method in the present application can be adopted to enable the UE to perform only partial pre-compensation when pre-compensating for a transmission timing for PRACH according to a TA compensation value autonomously obtained by the UE, which avoids collisions between PRACH transmission and other uplink transmissions resulting from an error of calculation (which is potentially caused due to the positioning precision) and a timing error as the UE determines the TA compensation value, thus increasing the success rate of random access or the resource utilization ratio.

the method in the present application ensures that the network can control the fallback of compensation according to coverage, satellite delay characteristics and other aspects when performing partial compensation for the transmission timing for PRACH, thereby avoiding excessive compensation or lack of compensation, further enhancing the random access performance.

by using the method in the present application, the UE is enabled to select a PRACH format according to whether it is capable of performing pre-compensation for uplink transmission timing, thus achieving support for users with varying compensation capabilities within a large-delay network.

with the method given in the present application, it is ensured that a PRACH format can be determined or limited according to a fallback value (or offset value) for partial compensation, thus making the compatibility between timing pre-compensation and the PRACH format possible, which, in turn avoids collisions between the PRACH transmission and other uplink transmissions, thus enhancing the performance of random access.

with the method given in the present application, a fallback value (or offset value) for partial compensation can thus be determined according to a configured PRACH format, with full consideration paid to an offset value of timing pre-compensation that is allowable for the PRACH format, one can guarantee a headroom for avoidance of collisions between a PRACH transmission and uplink transmission before and after, thus further preventing collisions of the PRACH with other uplink transmissions.

by using the method in the present application, when performing the selection of a cyclic prefix and a time-domain length of a preamble sequence, on the condition that limitation of an error of pre-compensation is taken into account, a selected PRACH format can be used to optimize the random access performance.

BRIEF DESCRIPTION OF THE DRAWINGS

Other features, objects and advantages of the present application will become more apparent from the detailed description of non-restrictive embodiments taken in conjunction with the following drawings:

FIG. 8 illustrates a schematic diagram of relations among a first timing compensation value, a first timing offset value and a first format according to one embodiment of the present application.

FIG. 9 illustrates a schematic diagram of a relation between a first timing offset value and a first format according to one embodiment of the present application.

FIG. 10 illustrates a schematic diagram of a relation between a first timing offset value and an error of a first timing compensation value according to one embodiment of the present application.

FIG. 11 illustrates a schematic diagram of a relation between a first parameter set and a first timing offset value according to one embodiment of the present application.

FIG. 12 illustrates a schematic diagram of relations among a length of a cyclic prefix, a number of time-domain resources occupied by a preamble sequence and an error of a timing compensation value according to one embodiment of the present application.

FIG. 13 illustrates a structure block diagram of a processing device in a first node according to one embodiment of the present application.

FIG. 14 illustrates a structure block diagram a processing device in a second node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
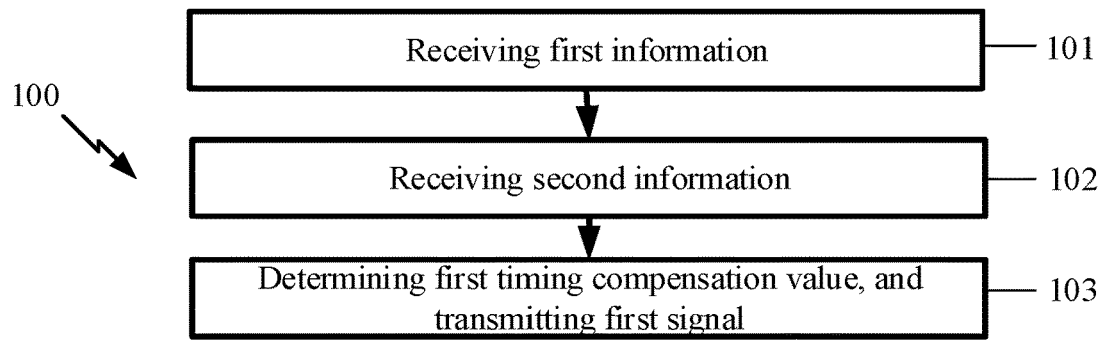
FIG. 1 illustrates a flowchart of first information, second information and a first signal according to one embodiment of the present application.

Embodiment 1 illustrates a flowchart of first information, second information and a first signal according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application receives first information in step 101; receives second information in step 102, the second information being used to determine a first timing offset value; and determines a first timing compensation value and transmits a first signal in step 103; herein, a time interval length between a start time for transmitting the first signal and a reference time is equal to a target timing compensation value, where the start time for transmitting the first signal is earlier than the reference time, and the reference time is a boundary time for a reference time-domain resource unit, the first information being used to determine a position of the reference time-domain resource unit in time domain; the first timing compensation value and the first timing offset value are jointly used to determine the target timing compensation value, the first timing offset value being greater than 0; the first signal is used for a random access, the first signal carrying a preamble sequence.

In one embodiment, the first node is in a Radio Resource Control_IDLE (RRC_IDLE) State when transmitting the first signal.

In one embodiment, the first node is in a Radio Resource Control_CONNECTED (RRC_CONNECTED) State when transmitting the first signal.

In one embodiment, the first node is in a Radio Resource Control_INACTIVE (RRC_INACTIVE) State when transmitting the first signal.

In one embodiment, the first information is transmitted via an air interface.

In one embodiment, the first information is transmitted via a radio interface.

In one embodiment, the first information is transmitted via a higher layer signaling.

In one embodiment, the first information is transmitted via a physical layer signaling.

In one embodiment, the first information comprises all or part of a Higher Layer signaling.

In one embodiment, the first information comprises all or part of a physical layer signaling.

In one embodiment, the first information comprises all or part of Information Elements (IEs) in a Radio Resource Control (RRC) signaling.

In one embodiment, the first information comprises all or part of fields in an Information Element (IE) in an RRC signaling.

In one embodiment, the first information comprises all or part of a Medium Access Control (MAC) layer signaling.

In one embodiment, the first information comprises all or part of a Master Information Block (MIB).

In one embodiment, the first information comprises all or part of a System Information Block (SIB).

In one embodiment, the first information comprises all or part of a System Information Block Type 1 (SIB1).

In one embodiment, the first information is transmitted through a Downlink Shared Channel (DL-SCH).

In one embodiment, the first information is transmitted through a Physical Downlink Shared Channel (PDSCH).

In one embodiment, the first information is carried by a synchronization signal.

In one embodiment, the first information is carried by a SS/PBCH Block.

In one embodiment, the first information is carried by a Demodulation Reference Signal (DM-RS) of a Physical Broadcast Channel (PBCH).

In one embodiment, the first information is jointly carried by both Payload and a Demodulation Reference Signal (DM-RS) of a Physical Broadcast Channel (PBCH).

In one embodiment, the first information is Cell-Specific.

In one embodiment, the first information is UE-Specific.

In one embodiment, the first information is UE group-specific.

In one embodiment, the first information is Footprint-Specific.

In one embodiment, the first information is Beam Specific.

In one embodiment, the first information is Geographical-zone-Specific.

In one embodiment, the first information comprises all or partial fields in a Downlink Control Information (DCI) signaling.

In one embodiment, the phrase that "the first information is used to determine a position of the reference time-domain resource unit in time domain" comprises the meaning that the first information is used by the first node in the present application to determine a time-domain position of the reference time-domain resource unit.

In one embodiment, the phrase that "the first information is used to determine a position of the reference time-domain resource unit in time domain" comprises the meaning that the first information is used for directly indicating a time-domain position of the reference time-domain resource unit.

In one embodiment, the phrase that "the first information is used to determine a position of the reference time-domain resource unit in time domain" comprises the meaning that the first information is used for indirectly indicating a time-domain position of the reference time-domain resource unit.

In one embodiment, the phrase that "the first information is used to determine a position of the reference time-domain resource unit in time domain" comprises the meaning that the first information is used for explicitly indicating a time-domain position of the reference time-domain resource unit.

In one embodiment, the phrase that "the first information is used to determine a position of the reference time-domain resource unit in time domain" comprises the meaning that the first information is used for implicitly indicating a time-domain position of the reference time-domain resource unit.

In one embodiment, the phrase that "the first information is used to determine a position of the reference time-domain resource unit in time domain" comprises the meaning that the first information is used to determine a first index, which is further used to determine a time-domain position of the reference time-domain resource unit, where the first index is a non-negative integer.

In one embodiment, the phrase that "the first information is used to determine a position of the reference time-domain resource unit in time domain" comprises the meaning that the first information is used to determine a first index, which is a Configuration Index for a Physical Random Access Channel (PRACH) further used to determine a time-domain position of the reference time-domain resource unit.

In one embodiment, the first information is carried by a higher layer signaling "prach-ConfigurationIndex".

In one embodiment, the first information comprises a List of higher layer signaling "prach-ConfigurationIndex".

In one embodiment, the phrase that "the first information is used to determine a position of the reference time-domain resource unit in time domain" comprises the meaning that the first information is used to determine a first index, which is further used to determine a time-domain position of the reference time-domain resource unit according to a mapping table, where the first index is a non-negative integer.

In one embodiment, the phrase that "the first information is used to determine a position of the reference time-domain resource unit in time domain" comprises the meaning that the first information is used to determine a first index, which is further used to determine a time-domain position of the reference time-domain resource unit according to a mapping relation, where the first index is a non-negative integer.

In one embodiment, the phrase that "the first information is used to determine a position of the reference time-domain resource unit in time domain" comprises the meaning that the first information is used for Downlink Synchronization, which is further used to determine a time-domain position of the reference time-domain resource unit.

In one embodiment, the phrase that "the first information is used to determine a position of the reference time-domain resource unit in time domain" comprises the meaning that the first information is used to determine a second index, which is an index for a SS/PBCH Block further used to determine a time-domain position of the reference time-domain resource unit.

In one embodiment, the phrase that "the first information is used to determine a position of the reference time-domain resource unit in time domain" comprises the meaning that the first information is used to determine a second index, which is an index for a SS/PBCH Block, the second index is used for Downlink Synchronization, which is further used to determine a time-domain position of the reference time-domain resource unit.

In one embodiment, the phrase that "the first information is used to determine a position of the reference time-domain resource unit in time domain" comprises the meaning that the first information is used to determine a second index, which is an index for a SS/PBCH Block, the second index is used for Downlink Reception Timing, which is further used to determine a time-domain position of the reference time-domain resource unit.

In one embodiment, the phrase that "the first information is used to determine a position of the reference time-domain resource unit in time domain" comprises the meaning that the first information is used to determine a second index, which is an index for a SS/PBCH Block further used to determine a time-domain position of a frame to which the reference time-domain resource unit belongs.

In one embodiment, the phrase that "the first information is used to determine a position of the reference time-domain resource unit in time domain" comprises the meaning that the first information and the second information are jointly used to determine a time-domain position of the reference time-domain resource unit.

In one embodiment, the second information is transmitted via an air interface.

In one embodiment, the second information is transmitted via a radio interface.

In one embodiment, the second information comprises all or part of a Higher Layer signaling.

In one embodiment, the second information comprises all or part of a physical layer signaling.

In one embodiment, the second information comprises all or part of Information Elements (IEs) in a Radio Resource Control (RRC) signaling.

In one embodiment, the second information comprises all or part of fields in an Information Element (IE) in an RRC signaling.

In one embodiment, the second information comprises all or part of a Medium Access Control (MAC) layer signaling.

In one embodiment, the second information comprises all or part of a System Information Block (SIB).

In one embodiment, the second information comprises all or part of a System Information Block Type 1 (SIB1).

In one embodiment, the second information is transmitted through a Downlink Shared Channel (DL-SCH).

In one embodiment, the second information is transmitted through a Physical Downlink Shared Channel (PDSCH).

In one embodiment, the second information is Cell-Specific.

In one embodiment, the second information is UE-Specific.

In one embodiment, the second information is UE group-specific.

In one embodiment, the second information is Footprint-Specific.

In one embodiment, the second information is Beam Specific.

In one embodiment, the second information is Geographical-zone-Specific.

In one embodiment, the second information comprises all or partial fields in a Downlink Control Information (DCI) signaling.

In one embodiment, the phrase that "the second information is used to determine a first timing offset value" comprises the meaning that the second information is used by the first node in the present application to determine the first timing offset value.

In one embodiment, the phrase that "the second information is used to determine a first timing offset value" comprises the meaning that the second information is used for directly indicating the first timing offset value.

In one embodiment, the phrase that "the second information is used to determine a first timing offset value" comprises the meaning that the second information is used for indirectly indicating the first timing offset value.

In one embodiment, the phrase that "the second information is used to determine a first timing offset value" comprises the meaning that the second information is used for explicitly indicating the first timing offset value.

In one embodiment, the phrase that "the second information is used to determine a first timing offset value" comprises the meaning that the second information is used for implicitly indicating the first timing offset value.

In one embodiment, the phrase that "the second information is used to determine a first timing offset value" comprises the meaning that the second information is used to determine a format used by the first signal, the format used by the first signal being used to determine the first timing offset value.

In one embodiment, the phrase that "the second information is used to determine a first timing offset value" comprises the meaning that the second information is used to determine a third index, the third index being used to determine a format used by the first signal, the format used by the first signal being used to determine the first timing offset value, where the third index is a non-negative integer.

In one embodiment, the phrase that "the second information is used to determine a first timing offset value" comprises the meaning that the second information is used to determine a third index, the third index being a Configuration Index for a Physical Random Access Channel (PRACH)

further used to determine a format used by the first signal, the format used by the first signal being used to determine the first timing offset value.

In one embodiment, the phrase that "the second information is used to determine a first timing offset value" comprises the meaning that the second information is used to determine the first format in the present application, the first format being used to determine the first timing offset value.

In one embodiment, the second information comprises a List of higher layer signaling "prach-ConfigurationIndex".

In one embodiment, the first information and the second information are carried by a same RRC signaling.

In one embodiment, the first information and the second information are carried by two different RRC signalings.

In one embodiment, the first information and the second information are carried by two different Information Elements (IEs) in a same RRC signaling.

In one embodiment, the first information and the second information are carried by two different fields in a same IE in a same RRC signaling.

In one embodiment, the first timing offset value is measured in milliseconds (ms).

In one embodiment, the first timing offset value is expressed in a number of Tc, where $Tc=1/(480000*4096)$ S.

In one embodiment, the first timing offset value is expressed in a number of OFDM symbols.

In one embodiment, the first timing offset value is expressed in a number of OFDM symbols corresponding to a subcarrier spacing of an Initial Bandwidth Part.

In one embodiment, the first timing offset value is expressed in a number of OFDM symbols corresponding to a subcarrier spacing of a Non-initial Bandwidth Part.

In one embodiment, the first timing offset value is expressed in a number of OFDM symbols corresponding to a subcarrier spacing of one or more subcarriers occupied by the first signal infrequency domain.

In one embodiment, the first timing offset value is equal to a time length of fallback on top of the first timing compensation value for the first node when transmitting the first signal.

In one embodiment, the first timing compensation value is a TA (Timing Advance) used for transmitting the first signal autonomously determined by the first node.

In one embodiment, the first timing compensation value is equal to an $N_{TA}$ for transmitting the first signal autonomously determined by the first node.

In one embodiment, the first timing compensation value is equal to a $T_{TA}$ for transmitting the first signal autonomously determined by the first node.

In one embodiment, the first timing compensation value is equal to a product of Tc and an $N_{TA}$ for transmitting the first signal autonomously determined by the first node, where $Tc=1/(480000*4096)$ second.

In one embodiment, the first timing compensation value is a half of a TA (Timing Advance) used for transmitting the first signal autonomously determined by the first node.

In one embodiment, the first timing compensation value is equal to a half of an $N_{TA}$ for transmitting the first signal autonomously determined by the first node.

In one embodiment, the first timing compensation value is equal to a half of a $T_{TA}$ for transmitting the first signal autonomously determined by the first node.

In one embodiment, the first timing compensation value is equal to a product of Tc and half of an $N_{TA}$ for transmitting the first signal autonomously determined by the first node, where $Tc=1/(480000*4096)$ second.

In one embodiment, the first timing compensation value is determined by the first node itself.

In one embodiment, the first timing compensation value is measured in milliseconds (ms).

In one embodiment, the first timing compensation value is expressed in a number of Tc, where $Tc=1/(480000*4096)$ s.

In one embodiment, the first timing compensation value is greater than 0.

In one embodiment, the first timing compensation value is expressed in a number of OFDM symbols.

In one embodiment, the first timing compensation value is equal to a time length of a maximum number of OFDM symbols which is no greater than a TA (Timing Advance) used for transmitting the first signal autonomously determined by the first node.

In one embodiment, the first signal is transmitted through a Physical Random Access Channel (PRACH).

In one embodiment, the first signal is a radio signal.

In one embodiment, the first signal is an air-interface signal.

In one embodiment, the first signal is a Baseband Signal.

In one embodiment, the first signal is a Radio Frequency (RF) signal.

In one embodiment, the phrase that "the first signal is used for a random access" comprises the meaning that the first signal is used for 4-step random access.

In one embodiment, the phrase that "the first signal is used for a random access" comprises the meaning that the first signal is used for 2-step random access.

In one embodiment, the phrase that "the first signal is used for a random access" comprises the meaning that the first signal is used for Type-1 random access.

In one embodiment, the phrase that "the first signal is used for a random access" comprises the meaning that the first signal is used for Type-2 random access.

In one embodiment, the first signal is used for an Msg1 in a 4-step random access.

In one embodiment, the first signal is used for an MsgA in a 2-step random access.

In one embodiment, the phrase of "the first signal carrying a preamble sequence" comprises a meaning that a Preamble Sequence is used for generating the first signal.

In one embodiment, the phrase of "the first signal carrying a preamble sequence" comprises a meaning that a Zadoff-Chu (ZC) sequence is used as a Preamble Sequence used for generating the first signal.

In one embodiment, the phrase of "the first signal carrying a preamble sequence" comprises a meaning that a Pseudo-random sequence is used as a Preamble Sequence used for generating the first signal.

In one embodiment, the phrase of "the first signal carrying a preamble sequence" comprises a meaning that a Zadoff-Chu (ZC) sequence with a length of 839 is used as a Preamble Sequence used for generating the first signal.

In one embodiment, the phrase of "the first signal carrying a preamble sequence" comprises a meaning that a Zadoff-Chu (ZC) sequence with a length of 139 is used as a Preamble Sequence used for generating the first signal.

In one embodiment, a Zadoff-Chu (ZC) Sequence with a length of 839 is used for generating the first signal.

In one embodiment, a Zadoff-Chu (ZC) Sequence with a length of 139 is used for generating the first signal.

In one embodiment, a Zadoff-Chu (ZC) Sequence with a length larger than 839 is used for generating the first signal.

In one embodiment, a start time for transmission of the first signal refers to a start time for transmission of an earliest OFDM symbol occupied by the first signal in time domain.

In one embodiment, a start time for transmission of the first signal refers to a start time for transmission of a cyclic prefix occupied by the first signal in time domain.

In one embodiment, a start time for transmission of the first signal refers to a start time for transmission of a cyclic prefix in an earliest OFDM symbol occupied by the first signal in time domain.

In one embodiment, a start time for transmission of the first signal refers to a start time for transmission of a slot to which an earliest OFDM symbol occupied by the first signal in time domain belongs.

In one embodiment, the target timing compensation value is measured in milliseconds (ms).

In one embodiment, the target timing compensation value is expressed in a number of Tc, where Tc=1/(480000*4096) s.

In one embodiment, the target timing compensation value is expressed in a number of OFDM symbols.

In one embodiment, the target timing compensation value is no greater than the first timing compensation value.

In one embodiment, the phrase that "the reference time is a boundary time for a reference time-domain resource unit" comprises the meaning that the reference time is a start time for the reference time-domain resource unit.

In one embodiment, the phrase that "the reference time is a boundary time for a reference time-domain resource unit" comprises the meaning that the reference time is an end time for the reference time-domain resource unit.

In one embodiment, the phrase that "the reference time is a boundary time for a reference time-domain resource unit" comprises the meaning that the reference time is a start time for the reference time-domain resource unit at the side of the first node.

In one embodiment, the phrase that "the reference time is a boundary time for a reference time-domain resource unit" comprises the meaning that the reference time is an end time for the reference time-domain resource unit at the side of the first node.

In one embodiment, the phrase that "the reference time is a boundary time for a reference time-domain resource unit" comprises the meaning that the reference time is a start time for reception of the reference time-domain resource unit.

In one embodiment, the phrase that "the reference time is a boundary time for a reference time-domain resource unit" comprises the meaning that the reference time is an end time for reception of the reference time-domain resource unit.

In one embodiment, the phrase that "the reference time is a boundary time for a reference time-domain resource unit" comprises the meaning that the reference time is a boundary time for reception of the reference time-domain resource unit.

In one embodiment, the reference time-domain resource unit is a time-domain resource occupied by a PRACH Occasion in time domain.

In one embodiment, the reference time-domain resource unit is a time-domain resource occupied by a PRACH Occasion in time domain assuming that $N_{TA}=0$.

In one embodiment, the reference time-domain resource unit is a time-domain resource occupied by a PRACH Occasion in time domain according to a downlink timing.

In one embodiment, the reference time-domain resource unit is a time-domain resource occupied by a PRACH Occasion in time domain according to a reception timing.

In one embodiment, the reference time-domain resource unit is a time-domain resource occupied by a PRACH Occasion in time domain assuming that TA (i.e., Timing Advance)=0.

In one embodiment, the reference time-domain resource unit is a downlink time-domain resource unit at the first node side corresponding to an uplink time-domain resource unit occupied by a PRACH Occasion.

In one embodiment, the reference time-domain resource unit is an earliest OFDM symbol occupied by the first signal in time domain assuming that $N_{TA}=0$.

In one embodiment, the reference time-domain resource unit is an earliest OFDM symbol occupied by the first signal in time domain according to a downlink timing.

In one embodiment, the reference time-domain resource unit is an earliest OFDM symbol assumed to be occupied by the first signal in time domain according to a reception timing.

In one embodiment, the reference time-domain resource unit is an earliest OFDM symbol occupied by the first signal in time domain assuming that TA (i.e., Timing Advance)=0.

In one embodiment, the reference time-domain resource unit comprises more than one time-domain consecutive OFDM symbols.

In one embodiment, the reference time-domain resource unit comprises only one OFDM symbol.

In one embodiment, the reference time-domain resource unit comprises a positive integer number of time-domain consecutive slots.

In one embodiment, the reference time-domain resource unit is a time-domain resource occupied by an earliest OFDM symbol in a PRACH Occasion configured by a "prach-ConfigurationIndex" signaling.

In one embodiment, the reference time-domain resource is a time-domain resource occupied by an OFDM symbol corresponding to a subcarrier spacing of 15 kHz.

In one embodiment, the reference time-domain resource is a time-domain resource occupied by an OFDM symbol corresponding to a first subcarrier spacing, where the first subcarrier spacing is equal to one of 30 kHz, 60 kHz or 120 kHz.

In one embodiment, when a subcarrier spacing of subcarrier(s) occupied by the first signal in frequency domain is equal to either 1.25 kHz or 5 kHz, the reference time-domain resource is a time-domain resource occupied by an OFDM symbol corresponding to a 15 kHz subcarrier spacing; when a subcarrier spacing of subcarrier(s) occupied by the first signal in frequency domain is greater than 5 kHz, the reference time-domain resource is a time-domain resource occupied by an OFDM symbol corresponding to a subcarrier spacing of subcarrier(s) occupied by the first signal in frequency domain.

In one embodiment, "a position of the reference time-domain resource unit in time domain" comprises: an index of the reference time-domain resource unit in time domain.

In one embodiment, "a position of the reference time-domain resource unit in time domain" comprises: a position of an earliest OFDM symbol comprised in the reference time-domain resource unit in time domain.

In one embodiment, "a position of the reference time-domain resource unit in time domain" comprises: an index of an earliest OFDM symbol comprised in the reference time-domain resource unit.

In one embodiment, "a position of the reference time-domain resource unit in time domain" comprises: an index of an earliest OFDM symbol comprised in the reference time-domain resource unit in a slot to which it belongs.

In one embodiment, "a position of the reference time-domain resource unit in time domain" comprises: an index of an earliest OFDM symbol comprised in the reference time-domain resource unit in a subframe to which it belongs.

In one embodiment, "a position of the reference time-domain resource unit in time domain" comprises: an index of an earliest OFDM symbol comprised in the reference time-domain resource unit in a frame to which it belongs.

In one embodiment, "a position of the reference time-domain resource unit in time domain" comprises: an index of an earliest OFDM symbol comprised in the reference time-domain resource unit in a slot to which it belongs, an index of a slot to which an earliest OFDM symbol comprised in the reference time-domain resource unit belongs in a subframe to which the slot belongs, an index of a subframe to which an earliest OFDM symbol comprised in the reference time-domain resource unit belongs in a frame the subframe belongs to, and an index of a frame to which an earliest OFDM symbol comprised in the reference time-domain resource unit belongs.

In one embodiment, "a position of the reference time-domain resource unit in time domain" comprises: an index of an earliest OFDM symbol comprised in the reference time-domain resource unit in a slot to which it belongs, an index of a subframe to which an earliest OFDM symbol comprised in the reference time-domain resource unit belongs in a frame the subframe belongs to, and an index of a frame to which an earliest OFDM symbol comprised in the reference time-domain resource unit belongs.

In one embodiment, the first information is also used to determine a number of time-domain resources occupied by the reference time-domain resource unit.

In one embodiment, the phrase that "the first timing compensation value and the first timing offset value are jointly used to determine the target timing compensation value" comprises the meaning that a difference between the first timing compensation value and the first timing offset value is equal to the target timing compensation value.

In one embodiment, the phrase that "the first timing compensation value and the first timing offset value are jointly used to determine the target timing compensation value" comprises the meaning that the first timing compensation value and the first timing offset value are jointly used by the first node in the present application for determining the target timing compensation value.

In one embodiment, the phrase that "the first timing compensation value and the first timing offset value are jointly used to determine the target timing compensation value" comprises the meaning that a target timing compensation value is linear with the first timing compensation value and the target timing compensation value is linear with the first timing offset value.

In one embodiment, the phrase that "the first timing compensation value and the first timing offset value are jointly used to determine the target timing compensation value" comprises the meaning that a target timing compensation value is positively linear with the first timing compensation value and the target timing compensation value is negatively linear with the first timing offset value.

In one embodiment, the phrase that "the first timing compensation value and the first timing offset value are jointly used to determine the target timing compensation value" comprises the meaning that the first timing compensation value and the first timing offset value are jointly used to determine the target timing compensation value based on operating function.

In one embodiment, a format used by the first signal is associated with the first timing offset value.

In one embodiment, a format used by the first signal is used to determine the first timing offset value.

In one embodiment, the first timing offset value is used to determine a format used by the first signal.

Embodiment 2

Figure 2:
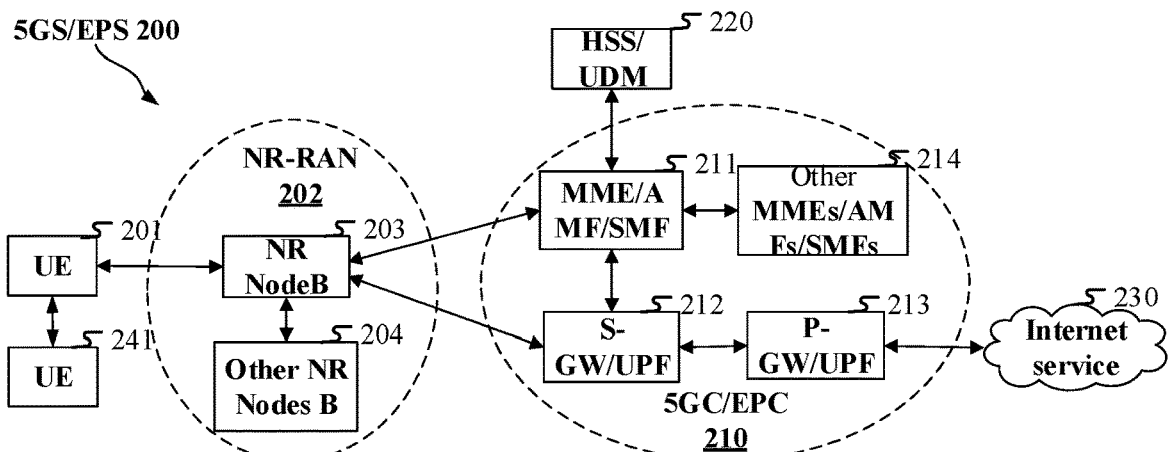
FIG. 2 illustrates a schematic diagram of a network architecture according to one embodiment of the present application.

Embodiment 2 illustrates a schematic diagram of a network architecture according to the present application, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System/Evolved Packet System (5GS/EPS) 200 or other suitable terminology. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/

UPF 212. The S-GW/UPF 212 is connected to the P-GW/ UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 supports transmissions in networks with large transmission delay.

In one embodiment, the UE 201 supports transmissions in networks with wide-range transmission delay differences.

In one embodiment, the UE 201 supports NTN.

In one embodiment, the gNB 203 corresponds to the second node in the present application.

In one embodiment, the gNB 203 supports transmissions in networks with large transmission delay.

In one embodiment, the gNB 203 supports transmissions in networks with wide-range transmission delay differences.

In one embodiment, the gNB 203 supports NTN.

Embodiment 3

Figure 3:
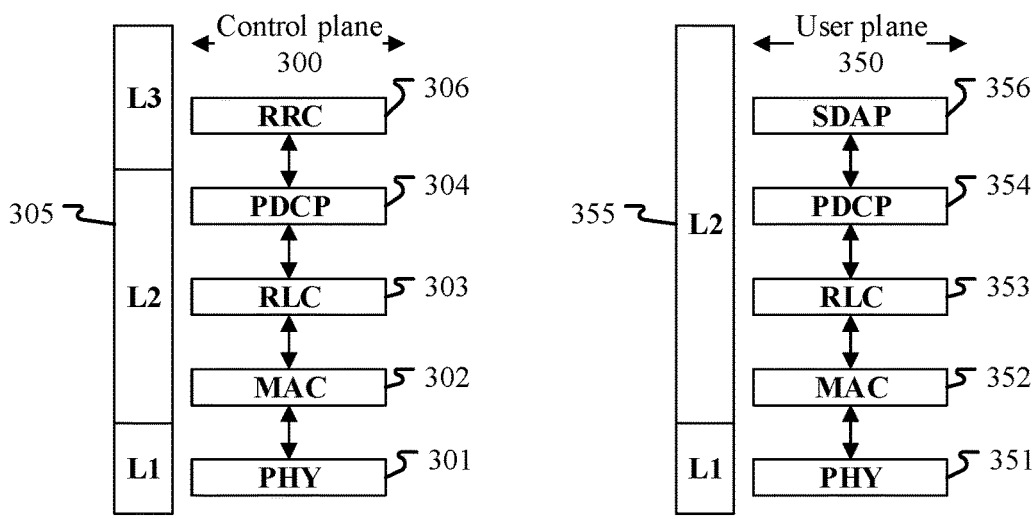
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, terminal device in NTN) and a second node (gNB, UE, or satellite in NTN or aircraft platform), is represented by three layers, i.e., layer 1, layer 2 and layer 3. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information in the present application is generated by the RRC 306.

In one embodiment, the first information in the present application is generate by the MAC 302 or the MAC 352.

In one embodiment, the first information in the present application is generated by the PHY 301 or the PHY 351.

In one embodiment, the second information in the present application is generated by the RRC 306.

In one embodiment, the second information in the present application is generate by the MAC 302 or the MAC 352.

In one embodiment, the second information in the present application is generated by the PHY 301 or the PHY 351.

In one embodiment, the first signal in the present application is generated by the RRC 306.

In one embodiment, the first signal in the present application is generate by the MAC 302 or the MAC 352.

In one embodiment, the first signal in the present application is generated by the PHY 301 or the PHY 351.

Embodiment 4

Figure 4:
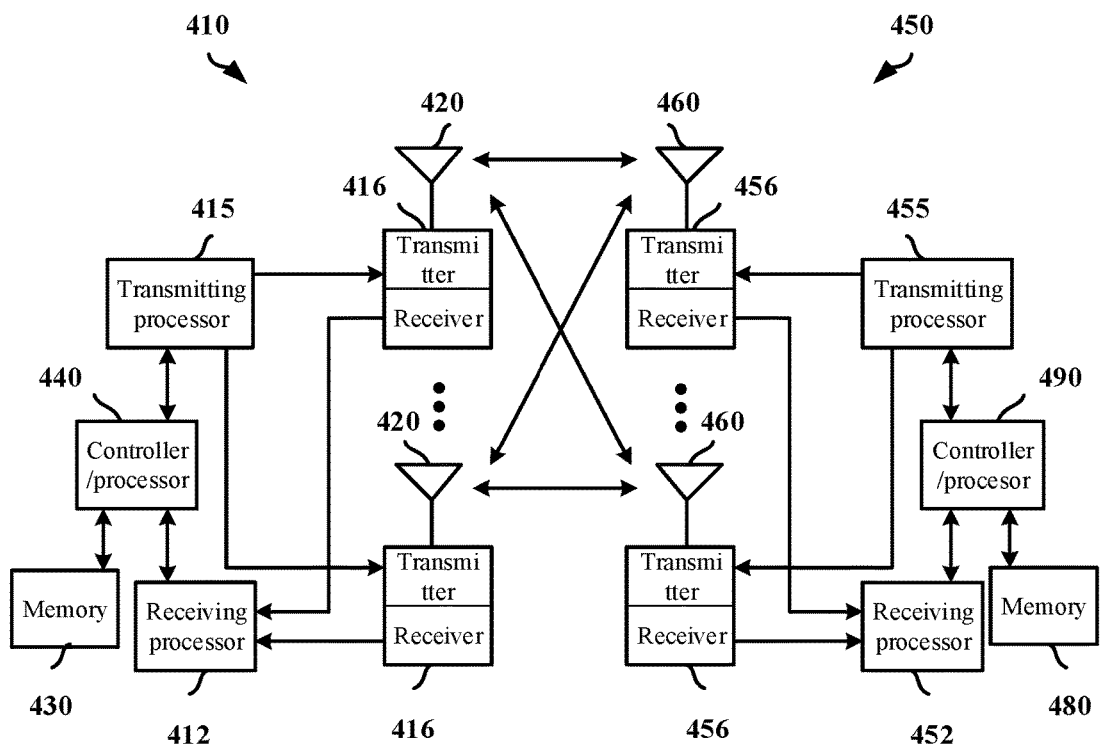
FIG. 4 illustrates a schematic diagram of a first node and a second node according to one embodiment of the present application.

Embodiment 4 illustrates a schematic diagram of a first node and a second node according to the present application, as shown in FIG. 4.

The first node (450) can comprise a controller/processor 490, a data source/buffer 480, a receiving processor 452, a transmitter/receiver 456 and a transmitting processor 455, where the transmitter/receiver 456 comprises an antenna 460.

The second node (410) can comprise a controller/processor 440, a data source/buffer 430, a receiving processor 412, a transmitter/receiver 416 and a transmitting processor 415, where the transmitter/receiver 416 comprises an antenna 420.

In Downlink (DL), a higher-layer packet, for instance higher-layer information contained in first information and second information in the present application is provided to the controller/processor 440. The controller/processor 440 provides functions of the L2 layer and above. In DL, the controller/processor 440 provides header compression, encryption, packet segmentation and reordering, multiplexing between a logical channel and a transport channel and radio resource allocation of the first node 450 based on various priorities. The controller/processor 440 is responsible for HARQ operation, retransmission of a lost packet and a signaling to the first node device 450, for example, both the first information and the second information in the present application are generated in the controller/processor 440. The transmitting processor 415 performs various signal processing functions used for the L1 (that is, PHY), including coding, interleaving, scrambling, modulation, power control/allocation, precoding and physical layer control signaling generation, for example, the generation of physical layer signals of the first information and second information in the present application is completed in the transmitting processor 415. Modulation symbols generated are divided into parallel streams and each stream is mapped to a corresponding multicarrier subcarrier and/or multicarrier symbol, and then is mapped to the antenna 420 by the transmitting processor 415 via the transmitter 416 and transmitted in the form of radio frequency signals. At the receiving end, each receiver 456 receives a radio frequency signal via a corresponding antenna 460, resumes baseband information modulated onto the radio frequency carriers and provides the baseband information to the receiving processor 452. The receiving processor 452 performs various signal reception processing functions of the L1 layer. The signal reception processing functions include receiving physical layer signals of the first information and second information in the present application and a third signal, and demodulating multicarrier symbols in multicarrier symbol flows based on each modulation scheme (e.g., BPSK, QPSK), de-scrambling, decoding and de-interleaving to recover data or control signal transmitted by the second node 410 on a physical channel, and then providing the data and control signal to the controller/processor 490. The controller/processor 490 is in charge of L2 and layers above, and interprets the first information and second information in the present application. The controller/processor can be associated with a memory 480 that stores program code and data. The memory 480 can be called a computer readable medium.

In UL, the data source/buffer 480 can be used to provide higher-layer data to the controller/processor 490. The data source/buffer 480 represents all protocol layers above the L2 layer (inclusive). The controller/processor 490 provides header compression, encryption, packet segmentation and reordering as well as multiplexing between a logical channel and a transport channel based on radio resources allocation of the second node 410, thereby implementing the L2 layer protocols used for the user plane and the control plane. The controller/processor 490 is responsible for HARQ operation, retransmission of a lost packet and a signaling to the second node 410. The transmitting processor 455 perform various signal transmitting processing functions used for the L1 layer (i.e., PHY), e.g., physical layer signals of the first signal in the present application are generated in the transmitting processor 455. The signal transmitting processing functions include sequence generation (for signals generated by a sequence), coding and interleaving to ensure a Forward Error Correction (FEC) of the UE 450 as well as modulation of baseband signals (for signals generated by bit blocks) based on each modulation scheme (e.g., BPSK, QPSK), dividing sequence-generated signals and modulation symbols into parallel streams and mapping each stream onto a corresponding multicarrier subcarrier and/or multicarrier symbol, which are then mapped to the antenna 460 by the transmitting processor 455 via the transmitter 456 and transmitted in the form of radio frequency signals. The receiver 416 receives a radio frequency signal via a corresponding antenna 420, each resumes baseband information modulated onto the radio frequency carriers and provides the baseband information to the receiving processor 412. The receiving processor 412 performs various signal receiving processing functions used for the L1 layer (i.e., PHY), which include receiving physical layer signals of the first signal in the present application, and also acquiring multicarrier symbol flows and demodulating multicarrier symbols within relative to sequence decorrelation and based on each modulation scheme (e.g., BPSK, QPSK), de-scrambling and de-interleaving to recover data or control signal originally transmitted by the first node 450 on a physical channel. Next, the data and/or control signal are provided to the controller/processor 440. The controller/processor 440 provides functions of the L2 layer. The controller/processor can be associated with a buffer 430 that stores program code and data, the buffer 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least receives first information; receives second information, the second information being used to determine a first timing offset value; and determines a first timing compensation value and transmits a first signal; herein, a time interval length between a start time for transmitting the first signal and a reference time is equal to a target timing compensation value, where the start time for transmitting the first signal is earlier than the reference time, and the reference time is a boundary time for a reference time-domain resource unit, the first information being used to determine a position of the reference time-domain resource unit in time domain; the first timing compensation value and the first timing offset value are jointly used to determine the target timing compensation value, the first timing offset value being greater than 0; the first signal is used for a random access, the first signal carrying a preamble sequence.

In one embodiment, the first node 450 comprises a memory that stores computer readable instruction program, the computer readable instruction program generates an action when executed by at least one processor, which includes: receiving first information; receiving second information, the second information being used to determine a first timing offset value; and determining a first timing compensation value and transmitting a first signal; herein, a time interval length between a start time for transmitting the first signal and a reference time is equal to a target timing compensation value, where the start time for the transmission of the first signal is earlier than the reference time, and the reference time is a boundary time for a reference time-domain resource unit, the first information being used to determine a position of the reference time-domain resource unit in time domain; the first timing compensation value and the first timing offset value are jointly used to determine the target timing compensation value, the first timing offset value being greater than 0; the first signal is used for a random access, the first signal carrying a preamble sequence.

In one embodiment, the second node 410 comprises at least one processor and at least one memory. The at least one memory comprises computer program codes; the at least one memory and the computer program codes are configured to be used in collaboration with the at least one processor. The second node 410 at least transmits first information; transmits second information, the second information being used to determine a first timing offset value; and detects a first signal; herein, a time interval length between a start time for transmitting the first signal and a reference time is equal to a target timing compensation value, where the start time for transmitting the first signal is earlier than the reference time, and the reference time is a boundary time for a reference time-domain resource unit, the first information being used to indicate a position of the reference time-domain resource unit in time domain; a first timing compensation value and the first timing offset value are jointly used to determine the target timing compensation value, the first timing offset value being greater than 0; the first signal is used for a random access, the first signal carrying a preamble sequence.

In one embodiment, the second node 410 comprises a memory that stores computer readable instruction program, the computer readable instruction program generates an action when executed by at least one processor, which includes: transmitting first information; transmitting second information, the second information being used to determine a first timing offset value; and detecting a first signal; herein, a time interval length between a start time for transmitting the first signal and a reference time is equal to a target timing compensation value, where the start time for transmitting the first signal is earlier than the reference time, and the reference time is a boundary time for a reference time-domain resource unit, the first information being used to indicate a position of the reference time-domain resource unit in time domain; a first timing compensation value and the first timing offset value are jointly used to determine the target timing compensation value, the first timing offset value being greater than 0; the first signal is used for a random access, the first signal carrying a preamble sequence.

In one embodiment, the first node 450 is a UE.

In one embodiment, the first node 450 is a UE supporting large delay transmissions.

In one embodiment, the first node 450 is a UE supporting wide-range transmission delay differences.

In one embodiment, the first node 450 is a UE supporting NTN.

In one embodiment, the second node 410 is a base station (gNB/eNB).

In one embodiment, the second node 410 is a base station supporting large transmission delay.

In one embodiment, the second node 410 is a base station supporting wide-range transmission delay differences.

In one embodiment, the second node 410 is a base station supporting NTN.

In one embodiment, the second node 410 is a satellite device.

In one embodiment, the second node 410 is a flight platform.

In one embodiment, the receiver 456 (comprising the antenna 460), the receiving processor 452 and the controller/processor 490 are used for receiving the first information in the present application.

In one embodiment, the receiver 456 (comprising the antenna 460), the receiving processor 452 and the controller/processor 490 are used for receiving the second information in the present application.

In one embodiment, the transmitter 456 (comprising the antenna 460), the transmitting processor 455 and the controller/processor 490 are used for transmitting the first signal in the present application.

In one embodiment, the transmitter 416 (comprising the antenna 420), the transmitting processor 415 and the controller/processor 440 are used for transmitting the first information in the present application.

In one embodiment, the transmitter 416 (comprising the antenna 420), the transmitting processor 415 and the controller/processor 440 are used for transmitting the second information in the present application.

In one embodiment, the receiver 416 (comprising the antenna 420), the receiving processor 412 and the controller/processor 440 are used for receiving the first signal in the present application.

Embodiment 5

Figure 5:
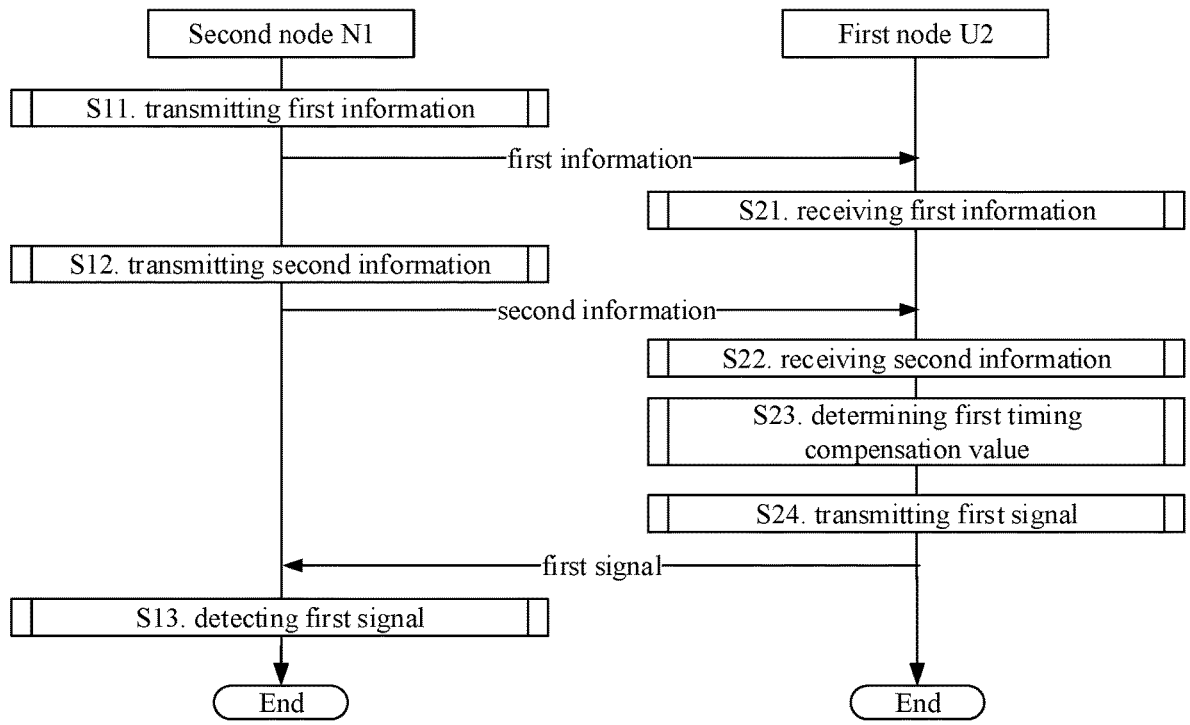
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, a second node N1 is a maintenance base station for a serving cell of a first node U2. It should be particularly noted that the sequence illustrated herein does not set any limit to the signal transmission order or implementation order in the present application.

The second node N1 transmits first information in step S11, transmits second information in step S12, and detects a first signal in step S13.

The first node U2 receives first information in step S21, receives second information in step S22, and determines a first timing compensation value in step S23, and transmits a first signal in step S24.

In Embodiment 5, the second information in the present application is used to determine a first timing offset value, a time interval length between a start time for transmitting the first signal in the present application and a reference time is equal to a target timing compensation value, where the start time for transmitting the first signal is earlier than the reference time, and the reference time is a boundary time for a reference time-domain resource unit, the first information being used to determine a position of the reference time-domain resource unit in time domain; the first timing compensation value and the first timing offset value are jointly used to determine the target timing compensation value, the first timing offset value being greater than 0; the first signal is used for a random access, the first signal carrying a preamble sequence.

In one embodiment, at least one of the first information or the second information is used to determine X candidate formats, where X is a positive integer greater than 1; at least one of the first timing compensation value or the first timing offset value is used to determine a first format out of the X candidate formats, the first format is one of the X candidate formats, and the first format is used to determine the first signal.

In one embodiment, the second information is used to determine a first parameter set, the first parameter set being used to determine the first timing offset value, the first parameter set consisting of a positive integer number of parameter(s).

Embodiment 6

Figure 6:
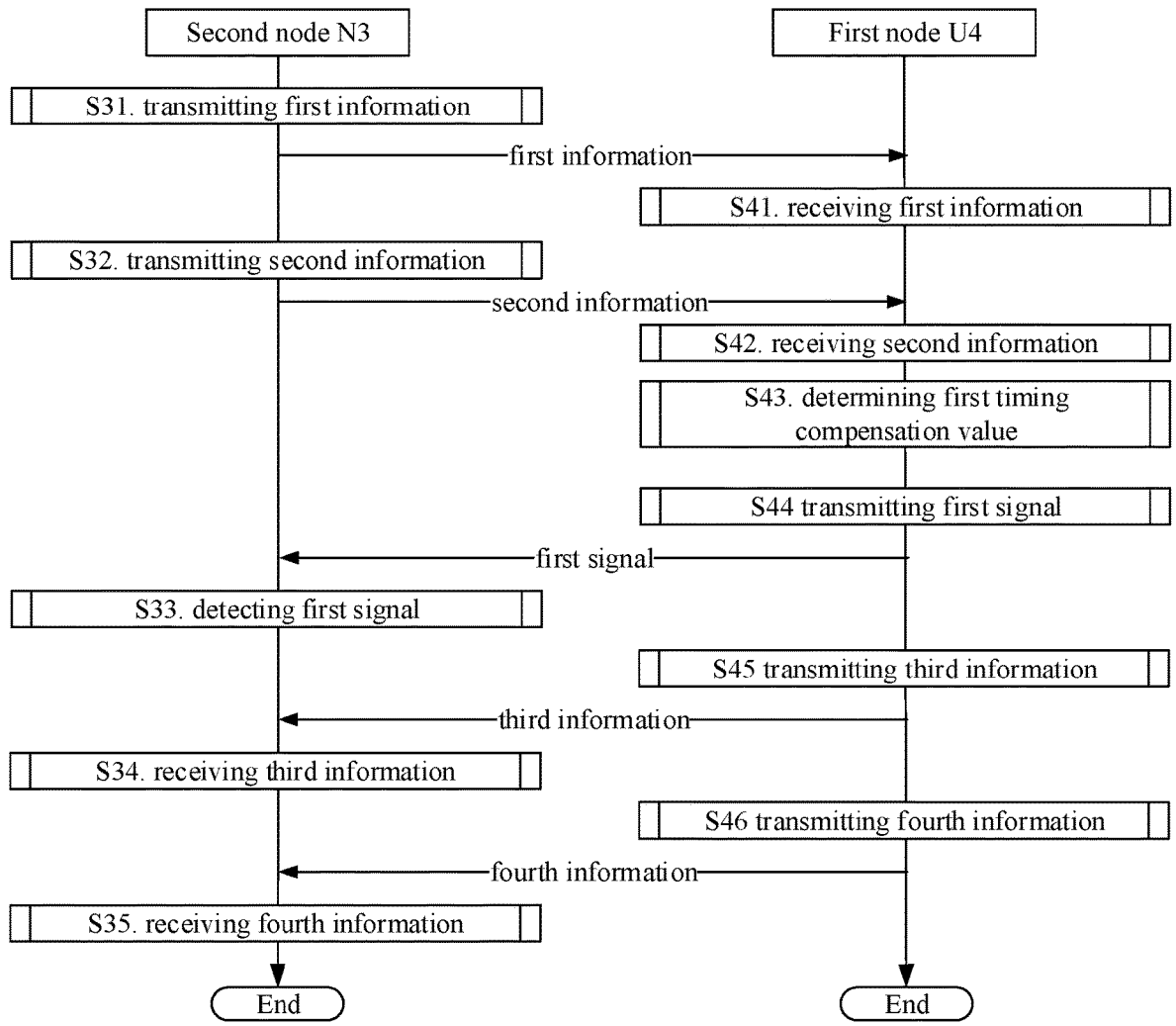
FIG. 6 illustrates a flowchart of radio signal transmission according to another embodiment of the present application.

Embodiment 6 illustrates a flowchart of signal transmission according to another embodiment of the present application, as shown in FIG. 6. In FIG. 6, a second node N3 is a maintenance base station for a serving cell of a first node U4. It should be particularly noted that the sequence illustrated herein does not set any limit to the signal transmission order or implementation order in the present application.

The second node N3 transmits first information in step S31, transmits second information in step S32, and detects a first signal in step S33, receives third information in step S34, and receives fourth information in step S35.

The first node U4 receives first information in step S41, receives second information in step S42, and determines a first timing compensation value in step S43, and transmits a first signal in step S44, transmits third information in step S45, and transmits fourth information in step S46.

In Embodiment 6, the second information in the present application is used to determine a first timing offset value, a time interval length between a start time for transmitting the first signal in the present application and a reference time is equal to a target timing compensation value, where the start time for transmitting the first signal is earlier than the reference time, and the reference time is a boundary time for a reference time-domain resource unit, the first information being used to determine a position of the reference time-domain resource unit in time domain; the first timing compensation value and the first timing offset value are jointly used to determine the target timing compensation value, the first timing offset value being greater than 0; the first signal is used for a random access, the first signal carrying a preamble sequence.

In one embodiment, the third information is used to indicate whether capabilities of the first node include a capability of pre-compensation for uplink timing.

In one embodiment, the third information is used to indicate whether capabilities of the first node include a capability of pre-compensation for a start time for uplink transmission.

In one embodiment, the fourth information is used to indicate an error of the first timing compensation value determined by the first node.

In one embodiment, the fourth information is used to indicate an upper limit of an absolute value of an error of the first timing compensation value determined by the first node.

Embodiment 7

Figure 7:
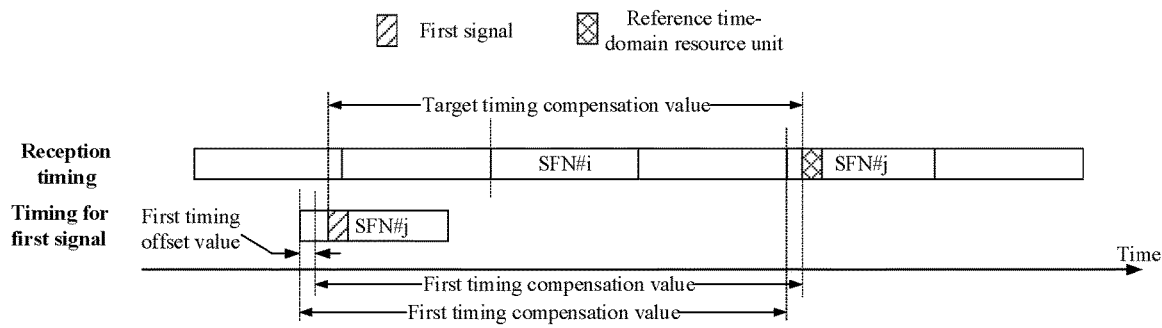
FIG. 7 illustrates a schematic diagram of relations among a first timing compensation value, a first timing offset value and a target timing compensation value according to one embodiment of the present application.

Embodiment 7 illustrates a schematic diagram of relations among a first timing compensation value, a first timing offset value and a target timing compensation value according to one embodiment of the present application, as shown in FIG. 7. In FIG. 7, the horizontal axis represents time, the slash-filled rectangle represents a first signal, and the cross-filled rectangle represents a reference time-domain resource unit.

In Embodiment 7, a time interval length between a start time for transmitting the first signal in the present application and a reference time is equal to a target timing compensation value, where the start time for transmitting the first signal is earlier than the reference time, and the reference time is a boundary time for a reference time-domain resource unit, the first information in the present application being used to determine a position of the reference time-domain resource unit in time domain; the first timing compensation value and the first timing offset value in the present application are jointly used to determine the target timing compensation value, the first timing offset value being greater than 0; the first signal is used for a random access, the first signal carrying a preamble sequence.

Embodiment 8

Embodiment 8 illustrates a schematic diagram of relations among a first timing compensation value, a first timing offset value and a first format according to one embodiment of the present application, as shown in FIG. 8. In FIG. 8, the first column on the left represents a timing compensation value, the second column on the left represents a timing offset value, the third column on the left represents a candidate format, a timing compensation value in a row in bold represents a first timing compensation value, while a timing offset value in a row in bold represents a first timing offset value, the candidate format in a row in bold represents a first format.

In Embodiment 8, at least one of the first information or the second information in the present application is used to determine X candidate formats, where X is a positive integer greater than 1; at least one of the first timing compensation value in the present application or the first timing offset value in the present application is used to determine a first format out of the X candidate formats, the first format is one of the X candidate formats, and the first format is used to determine the first signal in the present application.

In one embodiment, the phrase that "at least one of the first information or the second information is used to determine X candidate formats" comprises a meaning that at least one of the first information or the second information is used to determine whether each of the X candidate formats can be used or only one candidate format thereof can be used.

In one embodiment, the phrase that "at least one of the first information or the second information is used to determine X candidate formats" comprises a meaning that at least one of the first information or the second information is used to determine whether the X candidate formats can be used.

In one embodiment, the phrase that "at least one of the first information or the second information is used to determine X candidate formats" comprises a meaning that at least one of the first information or the second information is used by the first node in the present application to determine the X candidate formats.

In one embodiment, the phrase that "at least one of the first information or the second information is used to determine X candidate formats" comprises a meaning that at least one of the first information or the second information is used to directly indicate the X candidate formats.

In one embodiment, the phrase that "at least one of the first information or the second information is used to determine X candidate formats" comprises a meaning that at least one of the first information or the second information is used to indirectly indicate the X candidate formats.

In one embodiment, the phrase that "at least one of the first information or the second information is used to determine X candidate formats" comprises a meaning that at least one of the first information or the second information is used to explicitly indicate the X candidate formats.

In one embodiment, the phrase that "at least one of the first information or the second information is used to determine X candidate formats" comprises a meaning that at least one of the first information or the second information is used to implicitly indicate the X candidate formats.

In one embodiment, the phrase that "at least one of the first information or the second information is used to determine X candidate formats" comprises a meaning that both the first information and the second information are used to determine the X candidate formats.

In one embodiment, the phrase that "at least one of the first information or the second information is used to determine X candidate formats" comprises a meaning that the first information is used to determine the X candidate formats.

In one embodiment, the phrase that "at least one of the first information or the second information is used to determine X candidate formats" comprises a meaning that the second information is used to determine the X candidate formats.

In one embodiment, the phrase that "at least one of the first information or the second information is used to determine X candidate formats" comprises the meaning that at least one of the first information or the second information is used to determine the X Physical Random Access Channel (PRACH) Configuration Indexes, the X PRACH Configuration Indexes being respectively used to determine the X candidate formats.

In one embodiment, the phrase that "at least one of the first information or the second information is used to determine X candidate formats" comprises the meaning that at least one of the first information or the second information is used to determine Y Physical Random Access Channel (PRACH) Configuration Indexes, the Y PRACH Configuration Indexes being respectively used to determine the X candidate formats, where Y is a positive integer greater than X.

In one embodiment, any two candidate formats among the X candidate formats are different.

In one embodiment, there are two candidate formats among the X candidate formats being the same.

In one embodiment, any candidate format among the X candidate formats is a PRACH Preamble Format.

In one embodiment, any candidate format among the X candidate formats comprises at least one of a length of a Preamble sequence generating a PRACH, a type of a Preamble sequence generating a PRACH, a time length of a Cyclic Prefix (CP) comprised in a PRACH, a subcarrier spacing of a subcarrier(s) occupied by a PRACH in frequency domain, or a time length of applicable symbols (excluding CP) occupied by a PRACH in time domain.

In one embodiment, any candidate format among the X candidate formats comprises a length of a Preamble sequence, a length of a cyclic prefix, a number of time-domain resources occupied by a preamble sequence and a subcarrier spacing.

In one embodiment, any candidate format among the X candidate formats comprises a length of a Preamble sequence generating a PRACH, a type of a Preamble sequence generating a PRACH, a time length of a Cyclic Prefix (CP) comprised in a PRACH, a subcarrier spacing of a subcarrier(s) occupied by a PRACH in frequency domain, and a time length of applicable symbols (excluding CP) occupied by a PRACH in time domain.

In one embodiment, X is equal to 2.

In one embodiment, X is greater than 2.

In one embodiment, the phrase that "at least one of the first timing compensation value or the first timing offset value is used to determine a first format out of the X candidate formats" comprises the meaning that the first timing compensation value and the first timing offset value are jointly used to determine the first format out of the X candidate formats.

In one embodiment, the phrase that "at least one of the first timing compensation value or the first timing offset value is used to determine a first format out of the X candidate formats" comprises the meaning that the first timing compensation value is used to determine the first format out of the X candidate formats.

In one embodiment, the phrase that "at least one of the first timing compensation value or the first timing offset value is used to determine a first format out of the X candidate formats" comprises the meaning that the first timing offset value is used to determine the first format out of the X candidate formats.

In one embodiment, the phrase that "at least one of the first timing compensation value or the first timing offset value is used to determine a first format out of the X candidate formats" comprises the meaning that at least one of the first timing compensation value or the first timing offset value is used by the first node in the present application to determine the first format out of the X candidate formats.

In one embodiment, the phrase that "at least one of the first timing compensation value or the first timing offset value is used to determine a first format out of the X candidate formats" comprises the meaning that at least one of the first timing compensation value or the first timing offset value is used to determine the first format out of the X candidate formats conditioned on a mapping relationship.

In one embodiment, the phrase that "at least one of the first timing compensation value or the first timing offset value is used to determine a first format out of the X candidate formats" comprises the meaning that at least one of the first timing compensation value or the first timing offset value is used to determine the first format out of the X candidate formats conditioned on an operation relationship.

In one embodiment, the phrase that "at least one of the first timing compensation value or the first timing offset value is used to determine a first format out of the X candidate formats" comprises the meaning that whether the first timing compensation value is greater than 0 is used to determine the first format out of the X candidate formats.

In one embodiment, the phrase that "at least one of the first timing compensation value or the first timing offset value is used to determine a first format out of the X candidate formats" comprises the meaning that when the first timing compensation value is greater than 0, the first timing compensation value corresponds to the first format, when the first timing compensation value is equal to 0, the first timing compensation value corresponds to one of the X candidate formats other than the first format.

In one embodiment, the phrase that "at least one of the first timing compensation value or the first timing offset value is used to determine a first format out of the X candidate formats" comprises the meaning that the first timing compensation value is greater than 0, the first format being a candidate format with a Guard Period (GP) length no smaller than the first timing offset value among the X candidate formats.

In one embodiment, the phrase that "at least one of the first timing compensation value or the first timing offset value is used to determine a first format out of the X candidate formats" comprises the meaning that the first timing compensation value is used to determine X1 candidate formats out of the X candidate formats, any of the X1 candidate formats is one of the X candidate formats, where X1 is a positive integer less than X and greater than 1; the first timing offset value is used to determine the first format out of the X1 candidate formats.

In one embodiment, the phrase that "at least one of the first timing compensation value or the first timing offset value is used to determine a first format out of the X candidate formats" comprises the meaning that the first timing compensation value is used to determine X1 candidate formats out of the X candidate formats, any of the X1 candidate formats is one of the X candidate formats, where X1 is a positive integer less than X and greater than 1; the first format is a candidate format with a Guard Period (GP) length no smaller than the first timing offset value among the X1 candidate formats.

In one embodiment, the phrase that "at least one of the first timing compensation value or the first timing offset value is used to determine a first format out of the X candidate formats" comprises the meaning that the first timing compensation value is used to determine X1 candidate formats out of the X candidate formats, any of the X1 candidate formats is one of the X candidate formats, where X1 is a positive integer less than X and greater than 1; the first format is a candidate format with a Guard Period (GP) length no smaller than twice as much as the first timing offset value among the X1 candidate formats.

In one embodiment, the phrase that "at least one of the first timing compensation value or the first timing offset value is used to determine a first format out of the X candidate formats" comprises the meaning that the first timing compensation value is used to determine X1 candidate formats out of the X candidate formats, any of the X1 candidate formats is one of the X candidate formats, where X1 is a positive integer less than X and greater than 1; the first format is a candidate format with a Cyclic Prefix (CP) length no smaller than twice as much as the first timing offset value among the X1 candidate formats.

In one embodiment, the phrase that "at least one of the first timing compensation value or the first timing offset value is used to determine a first format out of the X candidate formats" comprises the meaning that the X candidate formats respectively correspond to X offset value ranges, the first timing offset value belongs to a first offset value range, the first offset value range being one of the X offset value ranges, the first format being a candidate format corresponding to the first offset value range among the X candidate formats.

In one embodiment, the phrase that "at least one of the first timing compensation value or the first timing offset value is used to determine a first format out of the X candidate formats" comprises the meaning that the first timing compensation value is used to determine X1 candidate formats out of the X candidate formats, any of the X1 candidate formats is one of the X candidate formats, where X1 is a positive integer less than X and greater than 1; the X1 candidate formats respectively correspond to X1 offset value ranges, the first timing offset value belongs to a first offset value range, the first offset value range being one of the X1 offset value ranges, the first format being a candidate format corresponding to the first offset value range among the X1 candidate formats.

In one embodiment, the phrase that "the first format is used to determine the first signal" comprises a meaning that the first format is a PRACH Preamble Format used by the first signal.

In one embodiment, the phrase that "the first format is used to determine the first signal" comprises a meaning that the first format is used to determine a number of time-domain resources occupied by the first signal.

In one embodiment, the phrase that "the first format is used to determine the first signal" comprises a meaning that the first format is used to determine a PRACH Preamble Format used by the first signal.

In one embodiment, the phrase that "the first format is used to determine a first signal" comprises a meaning that the first format is used by the first node in the present application to determine the first signal.

In one embodiment, the phrase that "the first format is used to determine the first signal" comprises a meaning that the first format is used to determine a time length of applicable symbols (excluding CP) occupied by the first signal in time domain.

In one embodiment, the phrase that "the first format is used to determine the first signal" comprises a meaning that the first format is used to determine a time length of applicable symbols (excluding CP) occupied by the first signal in time domain, while the first format and the first timing offset value are jointly used to determine a length of a CP comprised in the first signal.

In one embodiment, the phrase that "the first format is used to determine the first signal" comprises a meaning that the first format is used to determine a time length of applicable symbols (excluding CP) occupied by the first signal in time domain, and the first format is used to determine a target threshold; when the first timing offset value is smaller than or equal to the target threshold, a length of a CP comprised in the first signal is equal to a length of a CP corresponding to the first format; when the first timing offset value is larger than the target threshold, the length of a CP comprised in the first signal is smaller than the length of a CP corresponding to the first format.

In one embodiment, the phrase that "the first format is used to determine the first signal" comprises a meaning that the first format is used to determine a time length of applicable symbols (excluding CP) occupied by the first signal in time domain, and the first format is used to determine a target threshold; when the first timing offset value is smaller than or equal to the target threshold, a length of a CP comprised in the first signal is equal to a length of a CP corresponding to the first format; when the first timing offset value is larger than the target threshold, the length of a CP comprised in the first signal is equal to the length of a CP corresponding to the first format being subtracted by a length of puncturing, where the length of puncturing is equal to twice as much as a difference between the first timing offset value and the target threshold.

Embodiment 9

Embodiment 9 illustrates a schematic diagram of a relation between a first timing offset value and a first format according to one embodiment of the present application, as shown in FIG. 9. In FIG. 9, the first column on the left represents a candidate format, the second column on the left represents a timing offset value, a timing compensation value in a row in bold represents a first timing compensation value, while the candidate format in a row in bold represents a first format.

In Embodiment 9, when only the first timing compensation value of the first timing compensation value in the present application and the first timing offset value in the present application is used to determine the first format in the present application, the first format is used to determine the first timing offset value.

In one embodiment, the first node in the present application does not expect that a length of a GP corresponding to the first format is smaller than twice as much as an upper limit of the first timing offset value.

In one embodiment, the first node in the present application does not expect that the first format cannot satisfy the requirement for an upper limit of the first timing offset value.

In one embodiment, when only the first timing compensation value of the first timing compensation value and the first timing offset value is used to determine the first format, the first format is unrelated to the first timing offset value.

In one embodiment, when only the first timing compensation value of the first timing compensation value and the first timing offset value is used to determine the first format, a factor other than the first timing offset value is used to determine the first format.

In one embodiment, when only the first timing compensation value of the first timing compensation value and the first timing offset value is used to determine the first format, there isn't a factor other than the first timing compensation value and the first timing offset value that is used to determine the first format.

In one embodiment, when only the first timing compensation value of the first timing compensation value and the first timing offset value is used to determine the first format, there is a factor other than the first timing compensation value and the first timing offset value that is used to determine the first format.

In one embodiment, when only the first timing compensation value of the first timing compensation value and the first timing offset value is used to determine the first format, determination of the first format is independent from determination of the first timing offset value.

In one embodiment, when only the first timing compensation value of the first timing compensation value and the first timing offset value is used to determine the first format, determination of the first format is prior to determination of the first timing offset value.

In one embodiment, when only the first timing compensation value of the first timing compensation value and the first timing offset value is used to determine the first format, the first format is free from limitations of the first timing offset value.

In one embodiment, the phrase that "the first format is used to determine the first timing offset value" comprises a meaning that the first format is used by the first node in the present application to determine the first timing offset value.

In one embodiment, the phrase that "the first format is used to determine the first timing offset value" comprises a meaning that the first format is used to determine an upper limit of the first timing offset value.

In one embodiment, the phrase that "the first format is used to determine the first timing offset value" comprises a meaning that the first format is used to determine the first timing offset value conditioned on a corresponding relation.

In one embodiment, the phrase that "the first format is used to determine the first timing offset value" comprises a meaning that the first format is used to determine the first timing offset value conditioned on a table-based relation.

In one embodiment, the phrase that "the first format is used to determine the first timing offset value" comprises a meaning that the first timing offset value is linear with a length of a Cyclic Prefix (CP) corresponding to the first format.

In one embodiment, the phrase that "the first format is used to determine the first timing offset value" comprises a meaning that the first timing offset value is linear with a length of a Guard Period (GP) corresponding to the first format.

In one embodiment, the phrase that "the first format is used to determine the first timing offset value" comprises a meaning that the first timing offset value is linear with a time-domain time length occupied by a preamble sequence corresponding to the first format.

In one embodiment, the phrase that "the first format is used to determine the first timing offset value" comprises a meaning that the first timing offset value is equal to half of a length of a Guard Period (GP) corresponding to the first format.

In one embodiment, the phrase that "the first format is used to determine the first timing offset value" is implemented by means of the formula as follows:

$$t_{offset} = \frac{T_{GP} + T_{CP} - T_{CP\_min}}{2}$$

herein, $t_{offset}$ represents the first timing offset value, $T_{GP}$ represents a length of a Guard Period (GP) corresponding to the first format, $T_{CP}$ represents a length of a Cyclic Prefix (CP) corresponding to the first format, $T_{CP\_min}$ represents a pre-defined or configurable lower-limit value.

In one embodiment, the phrase that "the first format is used to determine the first timing offset value" is implemented by means of the formula as follows:

$$t_{offset} = \frac{T_{duration} - T_u - T_{CP\_min}}{2}$$

herein, $t_{offset}$ represents the first timing offset value, $T_{duration}$ represents a time length occupied in time domain by a PRACH Occasion corresponding to the first format, $T_u$ represents a time length occupied by a preamble sequence corresponding to the first format, $T_{CP\_min}$ represents a pre-defined or configurable lower-limit value.

In one embodiment, the phrase that "the first format is used to determine the first timing offset value" is implemented by means of the formula as follows:

$$t_{offset} = \frac{T_{duration} - T_u - T_{CP}}{2}$$

herein, $t_{offset}$ represents the first timing offset value, $T_{duration}$ represents a time length occupied in time domain by a PRACH Occasion corresponding to the first format, $T_u$ represents a time length occupied by a preamble sequence corresponding to the first format, $T_{CP}$ represents a length of a CP corresponding to the first format, $T_{CP\_min}$ represents a pre-defined or configurable lower-limit value.

Embodiment 10

Embodiment 10 illustrates a schematic diagram of a relation between a first timing offset value and an error of a first timing compensation value according to one embodiment of the present application, as shown in FIG. 10. In FIG. 10, the first column on the left represents a timing compensation error, the second column on the left represents a timing offset value, a timing compensation error in a row in bold represents an error of a first timing compensation value determined by the first node, while a timing offset value in a row in bold represents a first timing offset value.

In Embodiment 10, capabilities of the first node in the present application are used to determine the first timing compensation value in the present application, the first timing offset value in the present application being related to an error of the first timing compensation value determined by the first node.

In one embodiment, the first node in the present application autonomously determines the first timing compensation value.

In one embodiment, capabilities of the first node include a positioning capability of the first node.

In one embodiment, capabilities of the first node include a Timing Pre-Compensation Capability of the first node.

In one embodiment, capabilities of the first node include positioning precision of the first node.

In one embodiment, capabilities of the first node include whether the first node supports Global Navigation Satellite System (GNSS).

In one embodiment, capabilities of the first node include a capability of the first node of calculating a transmission distance between the first node and the second node in the present application.

In one embodiment, capabilities of the first node include a capability of the first node of calculating a transmission delay between the first node and the second node in the present application.

In one embodiment, capabilities of the first node include a capability of the first node of pre-compensating a transmission delay between the first node and the second node in the present application.

In one embodiment, capabilities of the first node include a capability of autonomously estimating an uplink Timing Advance by the first node.

In one embodiment, capabilities of the first node include a capability of autonomously pre-compensating an uplink Timing Advance by the first node.

In one embodiment, capabilities of the first node include a maximum error of autonomously pre-compensating an uplink Timing Advance by the first node.

In one embodiment, the first transmitter transmits third information;
herein, the third information is used to indicate whether capabilities of the first node include a capability of pre-compensation for uplink timing.

In one embodiment, the first transmitter transmits third information;
herein, the third information is used to indicate whether capabilities of the first node include a capability of pre-compensation for a start time for uplink transmission.

In one embodiment, the phrase that "capabilities of the first node are used to determine the first timing compensation value" comprises a meaning that the capabilities of the first node are used by the first node in the present application to determine the first timing compensation value.

In one embodiment, the phrase that "capabilities of the first node are used to determine the first timing compensation value" comprises a meaning that the capabilities of the first node are used by the first node in the present application to calculate the first timing compensation value.

In one embodiment, the phrase that "capabilities of the first node are used to determine the first timing compensation value" comprises a meaning that the capabilities of the first node are used by the first node in the present application to autonomously determine the first timing compensation value.

In one embodiment, the phrase that "capabilities of the first node are used to determine the first timing compensation value" comprises a meaning that when the capabilities of the first node include a capability of pre-compensation for an uplink Timing Advance, a value of an uplink Timing Advance pre-compensated by the first node is used to determine the first timing compensation value.

In one embodiment, the phrase that "capabilities of the first node are used to determine the first timing compensation value" comprises a meaning that the capabilities of the first node include a capability of pre-compensation for an uplink timing, a timing offset value for an uplink timing pre-compensated by the first node is used to determine the first timing compensation value.

In one embodiment, the phrase that "capabilities of the first node are used to determine the first timing compensation value" comprises a meaning that the capabilities of the first node include a capability of pre-compensation for transmission delay between the first node and the second node, a transmission delay between the first node and the second node in the present application pre-compensated by the first node is used to determine the first timing compensation value.

In one embodiment, the phrase of "the first timing offset value being related to an error of the first timing compensation value determined by the first node" comprises a meaning that the first timing offset value is related to an upper limit of an absolute value of an error of the first timing compensation value determined by the first node.

In one embodiment, the phrase of "the first timing offset value being related to an error of the first timing compensation value determined by the first node" comprises a meaning that the first timing offset value is related to a requirement for an error of the first timing compensation value determined by the first node.

In one embodiment, the phrase of "the first timing offset value being related to an error of the first timing compensation value determined by the first node" comprises a meaning that the first timing offset value is linear with an upper limit of an absolute value of an error of the first timing compensation value determined by the first node.

In one embodiment, the phrase of "the first timing offset value being related to an error of the first timing compensation value determined by the first node" comprises a meaning that a requirement for an error of the first timing compensation value determined by the first node is used to determine the first timing offset value.

In one embodiment, the phrase of "the first timing offset value being related to an error of the first timing compensation value determined by the first node" comprises a meaning that an upper limit of an absolute value of an error of the first timing compensation value determined by the first node is used to determine the first timing offset value.

In one embodiment, the phrase of "the first timing offset value being related to an error of the first timing compensation value determined by the first node" comprises a meaning that a requirement for an error of the first timing compensation value determined by the first node is used to determine a range of the first timing offset value.

In one embodiment, the phrase of "the first timing offset value being related to an error of the first timing compensation value determined by the first node" comprises a meaning that an upper limit of an absolute value of an error of the first timing compensation value determined by the first node is used to determine a range of the first timing offset value.

In one embodiment, the phrase in the present application that "the second information is used to determine a first timing offset value" comprises that the second information is used to determine the first timing offset value within a value range of the first timing offset value, an upper limit of an absolute value of an error of the first timing compensation value determined by the first node is used to determine a range of the first timing offset value.

In one embodiment, the phrase in the present application that "the second information is used to determine a first timing offset value" comprises that the second information is used to determine that the first timing compensation value can be unequal to 0, an upper limit of an absolute value of an error of the first timing compensation value determined by the first node is used to determine the first timing offset value.

In one embodiment, the phrase in the present application that "the second information is used to determine a first timing offset value" comprises that the second information is used to determine that the first timing compensation value can be unequal to 0, a requirement for an error of the first timing compensation value determined by the first node is used to determine the first timing offset value.

In one embodiment, an error of the first timing compensation value includes a calculation error of a pre-compensation for timing calculated by the first node and an error of timing for the first node.

In one embodiment, an error of the first timing compensation value includes a calculation error of a pre-compensation for timing calculated by the first node.

In one embodiment, an error of the first timing compensation value includes a calculation error of a pre-compensation for TA calculated by the first node.

In one embodiment, an error of the first timing compensation value includes a calculation error of a pre-compensation for timing calculated by the first node and a timing error of an Initial Transmission of the first node.

In one embodiment, the first timing offset value is related to a Timing Error Limit Value, i.e., $T_e$ for an Initial Transmission of the first node.

In one embodiment, an error of the first timing compensation value is related to a subcarrier spacing of subcarrier(s) occupied by a Synchronization Signal Block (SSB) in frequency domain.

In one embodiment, an error of the first timing compensation value is related to a subcarrier spacing of subcarrier(s) occupied by the first signal in frequency domain.

In one embodiment, an error of the first timing compensation value is related to a subcarrier spacing of subcarrier(s) occupied by a Synchronization Signal Block (SSB) in frequency domain as well as a subcarrier spacing of subcarrier(s) occupied by the first signal in frequency domain.

Embodiment 11

Embodiment 11 illustrates a schematic diagram of a relation between a first parameter set and a first timing offset value according to one embodiment of the present application, as shown in FIG. 11. In FIG. 11, the first column on the left represents parameter sets, the second column on the left represents timing offset values, a parameter set in a row in bold represents a first parameter set, while a timing offset value in a row in bold represents a first timing offset value, $a_i$, $b_i$ and $c_i$ respectively denote a parameter in a parameter set.

In Embodiment 11, the second information in the present application is used to determine a first parameter set, the first parameter set being used to determine the first timing offset value in the present application, the first parameter set consisting of a positive integer number of parameter(s).

In one embodiment, the phrase in the present application that "the second information is used to determine a first timing offset value" means that the first parameter set is used to determine the first timing offset value.

In one embodiment, the phrase that "the second information is used to determine a first parameter set" comprises the meaning that the second information is used by the first node in the present application to determine the first parameter set.

In one embodiment, the phrase that "the second information is used to determine a first parameter set" comprises the meaning that the second information is used for directly indicating the first parameter set.

In one embodiment, the phrase that "the second information is used to determine a first parameter set" comprises the meaning that the second information is used for indirectly indicating the first parameter set.

In one embodiment, the phrase that "the second information is used to determine a first parameter set" comprises the meaning that the second information is used for explicitly indicating the first parameter set.

In one embodiment, the phrase that "the second information is used to determine a first parameter set" comprises the meaning that the second information is used for implicitly indicating the first parameter set.

In one embodiment, the first parameter set comprises more than one parameter.

In one embodiment, the first parameter set only comprises one parameter.

In one embodiment, the phrase that "the first parameter set is used to determine the first timing offset value" comprises a meaning that the first parameter set is used by the first node in the present application to determine the first timing offset value.

In one embodiment, the phrase that "the first parameter set is used to determine the first timing offset value" comprises a meaning that the first parameter set is used to determine the first timing offset value conditioned on a mapping relation.

In one embodiment, the phrase that "the first parameter set is used to determine the first timing offset value" comprises a meaning that the first parameter set is used to determine the first timing offset value conditioned on a corresponding relation.

In one embodiment, the phrase that "the first parameter set is used to determine the first timing offset value" comprises a meaning that M1 candidate parameter sets respectively correspond to M1 candidate timing offset values, the first parameter set is one of the M1 candidate parameter sets, the first timing offset value being equal to a candidate timing offset value corresponding to the first parameter set among the M1 candidate timing offset values, M1 being a positive integer greater than 1.

In one embodiment, the phrase that "the first parameter set is used to determine the first timing offset value" comprises a meaning that M2 candidate parameter sets respectively correspond to M2 candidate timing offset value sets, the first parameter set is one of the M2 candidate parameter sets, the first timing offset value belongs to a first timing offset value set, the first timing offset value set is a candidate offset value set corresponding to the first parameter set among the M2 candidate timing offset value sets, and any one of the M2 candidate timing offset value sets comprises a positive integer number of offset value(s), M2 being a positive integer greater than 1.

In one embodiment, the first parameter set comprises at least one of an altitude parameter, a transmitter-type parameter, a delay parameter, an orbit parameter, or an ephemeris parameter.

In one embodiment, the first parameter set comprises one or more of a distance parameter, a transmitter-type parameter, a delay parameter, an orbit parameter, or an ephemeris parameter.

In one embodiment, the first parameter set comprises a delay parameter.

In one embodiment, the first parameter set comprises a first delay parameter, the first delay parameter being used to determine a start time for a Random Access Response Window.

In one embodiment, the first parameter set comprises a first delay parameter, the first delay parameter being used to determine a start time for time counting of a random access conflict resolution timer.

In one embodiment, the first parameter set comprises a first delay parameter, the first delay parameter being used to determine a scheduling delay between an Uplink Grant and a Physical Uplink Shared Channel (PUSCH).

In one embodiment, the first parameter set comprises a first delay parameter, the first delay parameter being used to determine a scheduling delay between an Uplink Grant in a Random Access Response (RAR) and an Msg3.

In one embodiment, the first parameter set comprises a first delay parameter, the first delay parameter being used to determine a delay between a Physical Downlink Control Channel (PDCCH) and a triggered Sound Reference Signal (SRS).

In one embodiment, the first parameter set comprises a first delay parameter, the first delay parameter being used to determine a delay between a Physical Downlink Control Channel (PDCCH) and a triggered Channel Status Information (CSI) report.

In one embodiment, the first parameter set comprises a first delay parameter, the first delay parameter being used to determine a delay between a CSI reference source and a CSI report.

In one embodiment, the first parameter set comprises a first type parameter, the first type parameter being used to determine a type of a transmitter for the second information.

In one embodiment, the first parameter set comprises a first type parameter, the first type parameter being used to determine that a transmitter for the second information is one of Low-Earth Orbit (LEO) satellite, Medium-Earth Orbit (MEO) satellite, Geostationary Earth Orbit (GEO) satellite, an Unmanned Aircraft Systems Platform (UAS) or High Elliptical Orbit (HEO) satellite.

In one embodiment, the first parameter set comprises a first distance parameter, the first distance parameter being used to determine a distance between a transmitter for the second information and the Nadir.

In one embodiment, the first parameter set comprises a first delay parameter, the first delay parameter being used to determine a Propagation Delay between a transmitter for the second information and the Nadir.

In one embodiment, the first parameter set comprises a first orbit parameter, the first orbit parameter being used to determine an orbit of a transmitter for the second information.

In one embodiment, the first parameter set comprises a first ephemeris parameter, the first ephemeris parameter being used to determine an Ephemeris of a transmitter for the second information.

Embodiment 12

Embodiment 12 illustrates a schematic diagram of relations among a length of a cyclic prefix, a number of time-domain resources occupied by a preamble sequence and an error of a timing compensation value according to one embodiment of the present application, as shown in FIG. 12. In FIG. 12, the rectangle marked with "CP" represents a cyclic prefix comprised in a first signal in time domain, the rectangle marked with "SEQ" represents a time-domain resource occupied by a preamble sequence carried by a first signal, $T_e$ represents an error of a first timing compensation value, $f_1(\cdot)$, $f_2(\cdot)$ and $f_4(\cdot)$ respectively represent three functions.

In Embodiment 12, at least one of a length of a cyclic prefix comprised in the first signal in time domain or a number of time-domain resources occupied by a preamble sequence carried by the first signal in the present application is related to an error of the first timing compensation value determined by the first node in the present application.

In one embodiment, "at least one of a length of a cyclic prefix comprised in the first signal in time domain or a number of time-domain resources occupied by a preamble sequence carried by the first signal" refers to: either or both of a length of a cyclic prefix comprised in the first signal in time domain and a number of time-domain resources occupied by a preamble sequence carried by the first signal.

In one embodiment, "at least one of a length of a cyclic prefix comprised in the first signal in time domain or a number of time-domain resources occupied by a preamble sequence carried by the first signal" refers to: a length of a cyclic prefix comprised in the first signal in time domain and a number of time-domain resources occupied by a preamble sequence carried by the first signal.

In one embodiment, "at least one of a length of a cyclic prefix comprised in the first signal in time domain or a number of time-domain resources occupied by a preamble sequence carried by the first signal" refers to: either of a length of a cyclic prefix comprised in the first signal in time domain and a number of time-domain resources occupied by a preamble sequence carried by the first signal.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" comprises a meaning that a length of a cyclic prefix comprised in the first signal in time domain and a number of time-domain resources occupied by a preamble sequence carried by the first signal are both related to an error of the first timing compensation value determined by the first node.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" comprises a meaning that a length of a cyclic prefix comprised in the first signal in time domain is related to an error of the first timing compensation value determined by the first node.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" comprises a meaning that a number of time-domain resources occupied by a preamble sequence carried by the first signal is related to an error of the first timing compensation value determined by the first node.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" comprises a meaning that at least one of a length of a cyclic prefix comprised in the first signal in time domain or a number of time-domain resources occupied by a preamble sequence carried by the first signal is related to the first timing offset value, which is further related to an error of the first timing compensation value determined by the first node.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" comprises a meaning that an error of the first timing compensation value determined by the first node is used to determine at least one of a length of a cyclic prefix comprised in the first signal in time domain or a number of time-domain resources occupied by a preamble sequence carried by the first signal.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" comprises a meaning that an upper limit of an absolute value of an error of the first timing compensation value determined by the first node is used to determine at least one of a length of a cyclic prefix comprised in the first signal in time domain or a number of time-domain resources occupied by a preamble sequence carried by the first signal.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" comprises a meaning that a requirement for an error of the first timing compensation value determined by the first node is used to determine at least one of a length of a cyclic prefix comprised in the first signal in time domain or a number of time-domain resources occupied by a preamble sequence carried by the first signal.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" comprises a meaning that an error of the first timing compensation value determined by the first node is used to determine at least one of a lower limit of a length of a cyclic prefix comprised in the first signal in time domain or a lower limit of a number of time-domain resources occupied by a preamble sequence carried by the first signal.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" comprises a meaning that an upper limit of an absolute value of an error of the first timing compensation value determined by the first node is used to determine at least one of a lower limit of a length of a cyclic prefix comprised in the first signal in time domain or a lower limit of a number of time-domain resources occupied by a preamble sequence carried by the first signal.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" comprises a meaning that an error of the first timing compensation value determined by the first node is used to determine at least one of an upper limit of a length of a cyclic prefix comprised in the first signal in time domain or an upper limit of a number of time-domain resources occupied by a preamble sequence carried by the first signal.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" comprises a meaning that an upper limit of an absolute value of an error of the first timing compensation value determined by the first node is used to determine at least one of an upper limit of a length of a cyclic prefix comprised in the first signal in time domain or an upper limit of a number of time-domain resources occupied by a preamble sequence carried by the first signal.

In one embodiment, at least one of a length of a cyclic prefix comprised in the first signal in time domain or a number of time-domain resources occupied by a preamble sequence carried by the first signal is also related to a Maximum Delay Spread that the first signal might have ever experienced.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" comprises a meaning that at least one of a lower limit of a length of a cyclic prefix comprised in the first signal in time domain or a lower limit of a number of time-domain resources occupied by a preamble sequence carried by the first signal is linearly correlated to an upper limit of an absolute value of an error of the first timing compensation value determined by the first node.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" comprises a meaning that at least one of an upper limit of a length of a cyclic prefix comprised in the first signal in time domain or an upper limit of a number of time-domain resources occupied by a preamble sequence carried by the first signal is linearly correlated to an upper limit of an absolute value of an error of the first timing compensation value determined by the first node.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" is completed through the following formula:

$$T_{CP} \geq T_e + \frac{1}{2}T_d$$

$$T_{SEQ} \geq 2T_e + T_d$$

herein, $T_{CP}$ represents a length of a cyclic prefix comprised in the first signal in time domain, $T_{SEQ}$ represents a number of time-domain resources occupied by a preamble sequence carried by the first signal, $T_e$ represents an error of the first timing compensation value determined by the first node, $T_d$ represents a maximum multi-path delay.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" is completed through the following formula:

$$T_{CP} \geq f_1(T_e)$$

$$T_{SEQ} \geq f_2(T_e)$$

herein, $T_{CP}$ represents a length of a cyclic prefix comprised in the first signal in time domain, $T_{SEQ}$ represents a number of time-domain resources occupied by a preamble sequence carried by the first signal, $T_e$ represents an error of the first timing compensation value determined by the first node, functions $f_1(\bullet)$ and $f_2(\bullet)$ respectively represent 2 fixed functions.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" is completed through the following formula:

$$T_{CP} \geq f_1(T_e)$$

$$T_{SEQ} \geq f_2(T_e)$$

$$T_{CP} + T_{SEQ} \leq f_3(T_e)$$

herein, $T_{CP}$ represents a length of a cyclic prefix comprised in the first signal in time domain, $T_{SEQ}$ represents a number of time-domain resources occupied by a preamble sequence carried by the first signal, $T_e$ represents an error of the first timing compensation value determined by the first node, functions $f_1(\bullet)$, $f_2(\bullet)$ and $f_3(\bullet)$ respectively represent 3 fixed functions.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" is completed through the following formula:

$$T_{CP} \geq f_1\left(T_e + \frac{1}{2}T_d\right)$$

$$T_{SEQ} \geq f_2\left(T_e + \frac{1}{2}T_d\right)$$

herein, $T_{CP}$ represents a length of a cyclic prefix comprised in the first signal in time domain, $T_{SEQ}$ represents a number of time-domain resources occupied by a preamble sequence carried by the first signal, $T_e$ represents an error of the first timing compensation value determined by the first node, $T_d$ represents a maximum multi-path delay, functions $f_1(\bullet)$ and $f_2(\bullet)$ respectively represent 2 fixed functions.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" is completed through the following formula:

$$T_{CP} \geq f_1(T_e)$$

$$T_{SEQ} \geq f_2(T_e)$$

$$T_{CP} + T_{SEQ} + T_{OFFSET} \leq T_{DUR} - f_3(T_e)$$

herein, $T_{CP}$ represents a length of a cyclic prefix comprised in the first signal in time domain, $T_{SEQ}$ represents a number of time-domain resources occupied by a preamble sequence carried by the first signal, $T_e$ represents an error of the first timing compensation value determined by the first node, $T_{OFFSET}$ represents the first timing offset value, $T_{DUR}$ represents a time length occupied by the reference time-domain resource unit in time domain, functions $f_1(\bullet)$, $f_2(\bullet)$ and $f_3(\bullet)$ respectively represent 3 fixed functions.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" is completed through the following formula:

$$T_{CP} \geq T_e + \frac{1}{2}T_d$$

$$T_{SEQ} \geq 2T_e + T_d$$

$$T_{CP} + T_{SEQ} + T_{OFFSET} \leq T_{DUR} - T_e$$

herein, $T_{CP}$ represents a length of a cyclic prefix comprised in the first signal in time domain, $T_{SEQ}$ represents a number of time-domain resources occupied by a preamble sequence carried by the first signal, $T_e$ represents an error of the first timing compensation value determined by the first node, $T_{OFFSET}$ represents the first timing offset value, $T_{DUR}$ represents a time length occupied by the reference time-domain resource unit in time domain.

In one embodiment, the phrase that "at least one of a length of a cyclic prefix comprised in the first signal in time domain or a number of time-domain resources occupied by a preamble sequence carried by the first signal is related to an error of the first timing compensation value determined by the first node" is completed through the following formula:

$$T_{CP} \geq T_e + \frac{1}{2}T_d$$

$$T_{SEQ} \geq 2T_e + T_d$$

$$T_{CP} + T_{SEQ} + T_{OFFSET} \leq T_{DUR}$$

herein, $T_{CP}$ represents a length of a cyclic prefix comprised in the first signal in time domain, $T_{SEQ}$ represents a number of time-domain resources occupied by a preamble sequence carried by the first signal, $T_e$ represents an error of the first timing compensation value determined by the first node, $T_{OFFSET}$ represents the first timing offset value, $T_{DUR}$ represents a time length occupied by the reference time-domain resource unit in time domain.

In one embodiment, the first transmitter in the present application transmits fourth information; herein, the fourth information is used to indicate an error of the first timing compensation value determined by the first node.

In one embodiment, the first transmitter in the present application transmits fourth information; herein, the fourth information is used to indicate an upper limit of an absolute value of an error of the first timing compensation value determined by the first node.

Embodiment 13

Embodiment 13 illustrates a structure block diagram of a processing device in a first node in one embodiment, as shown in FIG. 13. In FIG. 13, a processing device 1300 in the first node is comprised of a first receiver 1301, a second receiver 1302 and a first transmitter 1303. The first receiver 1301 comprises the transmitter/receiver 456 (comprising the antenna 460), the receiving processor 452 and the controller/processor 490 in FIG. 4 of the present application; the second receiver 1302 comprises the transmitter/receiver 456 (comprising the antenna 460), the transmitting processor 452 and the controller/processor 490 in FIG. 4 of the present application; the first transmitter 1303 comprises the transmitter/receiver 456 (comprising the antenna 460), the transmitting processor 455 and the controller/processor 490 in FIG. 4 of the present application.

In Embodiment 13, the first receiver 1301 receives first information; the second receiver 1302 receives second information, the second information being used to determine a first timing offset value; and the first transmitter 1303 determines a first timing compensation value and transmits a first signal; herein, a time interval length between a start time for transmitting the first signal and a reference time is equal to a target timing compensation value, where the start time for transmitting the first signal is earlier than the reference time, and the reference time is a boundary time for a reference time-domain resource unit, the first information being used to determine a position of the reference time-domain resource unit in time domain; the first timing compensation value and the first timing offset value are jointly used to determine the target timing compensation value, the first timing offset value being greater than 0; the first signal is used for a random access, the first signal carrying a preamble sequence.

In one embodiment, at least one of the first information or the second information is used to determine X candidate formats, where X is a positive integer greater than 1; at least one of the first timing compensation value or the first timing offset value is used to determine a first format out of the X candidate formats, the first format is one of the X candidate formats, and the first format is used to determine the first signal.

In one embodiment, at least one of the first information or the second information is used to determine X candidate formats, where X is a positive integer greater than 1; at least one of the first timing compensation value or the first timing offset value is used to determine a first format out of the X candidate formats, the first format is one of the X candidate formats, and the first format is used to determine the first signal; when only the first timing compensation value of the first timing compensation value and the first timing offset value is used to determine the first format, the first format is used to determine the first timing offset value.

In one embodiment, a capability of the first node is used to determine the first timing compensation value, the first timing offset value being related to an error of the first timing compensation value determined by the first node.

In one embodiment, the second information is used to determine a first parameter set, the first parameter set being used to determine the first timing offset value, the first parameter set consisting of a positive integer number of parameter(s).

In one embodiment, at least one of a length of a cyclic prefix comprised in the first signal in time domain or a number of time-domain resources occupied by a preamble sequence carried by the first signal is related to an error of the first timing compensation value determined by the first node.

Embodiment 14

Embodiment 14 illustrates a structure block diagram of a processing device in a second node in one embodiment, as shown in FIG. 14. In FIG. 14, a processing device 1400 in the second node is comprised of a second transmitter 1401, a third transmitter 1402 and a third receiver 1403. The second transmitter 1401 comprises the transmitter/receiver 416 (comprising the antenna 460), the transmitting processor 415 and the controller/processor 440 in FIG. 4 of the present application; the third transmitter 1402 comprises the transmitter/receiver 416 (comprising the antenna 460), the transmitting processor 415 and the controller/processor 440 in FIG. 4 of the present application; the third receiver 1403 comprises the transmitter/receiver 416 (comprising the antenna 420), the receiving processor 412 and the controller/processor 440 in FIG. 4 of the present application.

In Embodiment 14, the second transmitter 1401 transmits first information; the third transmitter 1402 transmits second information, the second information being used to determine a first timing offset value; and the third receiver 1403 detects a first signal; herein, a time interval length between a start time for transmitting the first signal and a reference time is equal to a target timing compensation value, where the start time for transmitting the first signal is earlier than the reference time, and the reference time is a boundary time for a reference time-domain resource unit, the first information being used to indicate a position of the reference time-domain resource unit in time domain; a first timing compensation value and the first timing offset value are jointly used to determine the target timing compensation value, the first timing offset value being greater than 0; the first signal is used for a random access, the first signal carrying a preamble sequence.

In one embodiment, at least one of the first information or the second information is used to determine X candidate formats, where X is a positive integer greater than 1; at least one of the first timing compensation value or the first timing offset value is used to determine a first format out of the X candidate formats, the first format is one of the X candidate formats, and the first format is used to determine the first signal.

In one embodiment, at least one of the first information or the second information is used to determine X candidate formats, where X is a positive integer greater than 1; at least one of the first timing compensation value or the first timing offset value is used to determine a first format out of the X candidate formats, the first format is one of the X candidate formats, and the first format is used to determine the first signal; when only the first timing compensation value of the first timing compensation value and the first timing offset value is used to determine the first format, the first format is used to determine the first timing offset value.

In one embodiment, a capability of the first node is used to determine the first timing compensation value, the first timing offset value being related to an error of the first timing compensation value determined by the first node.

In one embodiment, the second information is used to determine a first parameter set, the first parameter set being used to determine the first timing offset value, the first parameter set consisting of a positive integer number of parameter(s).

In one embodiment, at least one of a length of a cyclic prefix comprised in the first signal in time domain or a number of time-domain resources occupied by a preamble sequence carried by the first signal is related to an error of the first timing compensation value determined by the first node.

In one embodiment, the detection refers to Correlation detection.

In one embodiment, the detection refers to sequence detection.

In one embodiment, the detection refers to energy detection.

In one embodiment, the detection refers to sequence auto-correlation and sequence cross-correlation detection.

In one embodiment, the detection refers to Sequence-Correlation detection.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node or the second node, or UE or terminal includes but is not limited to mobile phones, tablet computers, notebooks, network cards, low-consumption equipment, enhanced MTC (eMTC) terminals, NB-IoT terminals, vehicle-mounted communication equipment, aircrafts, diminutive airplanes, unmanned aerial vehicles, telecontrolled aircrafts, etc. The base station or network equipment in the present application includes but is not limited to macro-cellular base stations, micro-cellular base stations, home base stations, relay base station, eNB, gNB, Transmitter Receiver Point (TRP), relay satellite, satellite base station, airborne base station and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE) configured for wireless communications, the UE comprising:
   a receiver;
   a transmitter; and
   a processor, wherein:
   the receiver is configured to receive first information;
   the receiver is further configured to receive second information;
   the processor is configured to determine a timing compensation value;
   the processor is further configured to determine a timing offset value based on the second information;
   the processor is further configured to determine a target timing compensation value based on the determined timing offset value and the determined timing compensation value; and
   the transmitter is configured to transmit a first message using the determined target timing compensation value, wherein a time interval length between a start time for transmission of the first message and a reference time is equal to the target timing compensation value, wherein the reference time is a boundary time for a reference time-domain resource unit, and wherein the reference time-domain resource unit is a based on the first information.

2. The UE of claim 1, wherein at least one of the first information or the second information is used to determine a plurality of candidate formats, wherein at least one of the timing compensation value or the timing offset value is used to determine a format out of the plurality of candidate formats, and wherein the format is used to determine the first message.

3. The UE of claim 2, wherein when only the timing compensation value and the timing offset value is used to determine the format, wherein the format is used to determine the timing offset value, wherein the timing offset value is linear with a length of a cyclic prefix (CP) corresponding to the format.

4. The UE of claim 1, wherein a capability of the UE is used to determine the timing compensation value, wherein the timing offset value is related to an error of the timing compensation value determined by the UE.

5. The UE of claim 1, wherein the second information is used to determine a parameter set, wherein the parameter set is used to determine the timing offset value.

6. The UE of claim 1, wherein at least one of a length of a cyclic prefix comprised in the first message in time domain or a number of time-domain resources occupied by a preamble sequence included in the first message is related to an error of the timing compensation value determined by the UE.

7. The UE of claim 1, wherein the timing compensation value is expressed in a number of Tc, where Tc=1/(480000*4096) second.

8. The UE of claim 1, wherein the first message comprises a preamble sequence.

9. The UE of claim 1, wherein the reference time-domain resource unit is a time domain resource occupied by a physical random access channel (PRACH) occasion in a time domain.

10. The UE of claim 1, wherein:
the processor is further configured to determine a position of the reference time-domain unit based on the first information.

11. A method for use in a user equipment (UE) for wireless communications, the method comprising:
receiving first information;
receiving second information;
determining a timing compensation value;
determining a timing offset value based on the second information;
determining a target timing compensation value based on the determined timing offset value and the determined timing compensation value; and
transmitting a first message using the determined target timing compensation value, wherein a time interval length between a start time for transmitting the first message and a reference time is equal to the target timing compensation value, wherein the reference time is a boundary time for a reference time-domain resource unit, and wherein the reference time-domain resource unit is based on the first information.

12. The method of claim 11, wherein at least one of the first information or the second information is used to determine a plurality of candidate formats, wherein at least one of the timing compensation value or the timing offset value is used to determine a format out of the plurality of candidate formats, and wherein the format is used to determine the first message.

13. The method of claim 12, wherein when only the timing compensation value and the timing offset value is used to determine the format, wherein the format is used to determine the timing offset value, wherein the timing offset value is linear with a length of a cyclic prefix (CP) corresponding to the format.

14. The method of claim 11, wherein a capability of the UE is used to determine the timing compensation value, wherein the timing offset value is related to an error of the timing compensation value determined by the UE.

15. The method of claim 11, wherein the second information is used to determine a parameter set, wherein the parameter set is used to determine the timing offset value.

16. The method of claim 11, wherein at least one of a length of a cyclic prefix comprised in the first message in time domain or a number of time-domain resources occupied by a preamble sequence included in the first message is related to an error of the timing compensation value determined by the UE.

17. The method of claim 11, wherein the timing compensation value is expressed in a number of Tc, where Tc=1/(480000*4096) second.

18. The method of claim 11, wherein the first message comprises a preamble sequence.

19. The method of claim 11, wherein the reference time-domain resource unit is a time domain resource occupied by a physical random access channel (PRACH) occasion in a time domain.

20. The method of claim 11, further comprising:
determining a position of the reference time-domain unit based on the first information.

\* \* \* \* \*